(12) United States Patent
Dasher et al.

(10) Patent No.: US 12,542,848 B2
(45) Date of Patent: Feb. 3, 2026

(54) SYSTEMS AND METHODS FOR DYNAMICALLY SHARING MEDIA BASED ON CONTACT PROXIMITY, GROUP PARTICIPATION, OR EVENT

(71) Applicant: Adeia Guides Inc., San Jose, CA (US)

(72) Inventors: Charles Dasher, Lawrenceville, GA (US); Christopher Phillips, Hartwell, GA (US); Jean-Yves Couleaud, Mission Viejo, CA (US)

(73) Assignee: Adeia Guides Inc., San Jose, CA (US)

(*) Notice: Subject to any disclaimer, the term of this patent is extended or adjusted under 35 U.S.C. 154(b) by 385 days.

(21) Appl. No.: 18/123,706

(22) Filed: Mar. 20, 2023

(65) Prior Publication Data

US 2024/0323275 A1   Sep. 26, 2024

(51) Int. Cl.
| | |
|---|---|
| H04M 1/72457 | (2021.01) |
| G06V 20/30 | (2022.01) |
| G06V 40/16 | (2022.01) |
| G06V 40/50 | (2022.01) |
| H04M 1/72439 | (2021.01) |
| H04M 1/72451 | (2021.01) |

(52) U.S. Cl.
CPC ........ H04M 1/72457 (2021.01); G06V 20/30 (2022.01); G06V 40/172 (2022.01); G06V 40/50 (2022.01); H04M 1/72439 (2021.01); H04M 1/72451 (2021.01)

(58) Field of Classification Search
CPC ......... H04M 1/72457; H04M 1/72439; H04M 1/72451; G06V 20/30; G06V 40/172; G06V 40/50
See application file for complete search history.

(56) References Cited

U.S. PATENT DOCUMENTS 9,531,823 B1 *  12/2016  Suchland ............... H04W 4/023
10,257,291 B1 *  4/2019  Matiash ................ H04L 67/535
(Continued)

FOREIGN PATENT DOCUMENTS

AU    2015207932 A1 *  2/2016  ............... G06F 8/62
EP       3910460 A1 * 11/2021  ............ H04W 4/023
(Continued)

OTHER PUBLICATIONS

U.S. Appl. No. 18/882,601, filed Sep. 11, 2024, Charles Dasher.
U.S. Appl. No. 18/123,707, filed Mar. 20, 2023, Charles Dasher.

Primary Examiner — Nizar N Sivji
(74) Attorney, Agent, or Firm — HALEY GUILIANO LLP

(57) ABSTRACT

Systems and methods for dynamically sharing a media item based on satisfying a condition are disclosed. The methods provide the media item for selection based on selection of a contact or vice versa. The media item may be photo, video, audio, or another type of item in which the contact is included, e.g., the contact is in the photo selected. The methods determine the media item is relevant to the contact based on a facial recognition match. The shared media item, which may be a photo, automatically replaces, for example, a wallpaper or lock screen of the contact. The methods also disclose a shared camera that allows users in a proximity of a first user to opt into a shared group. Once they join/opt in, any photo taken or viewed by the first user is simultaneously displayed on the display of all members of the shared group.

20 Claims, 25 Drawing Sheets

(56) References Cited

U.S. PATENT DOCUMENTS

| | | | |
|---|---|---|---|
| 10,560,462 B2* | 2/2020 | Vicente | H04L 63/102 |
| 2014/0086510 A1* | 3/2014 | Couillard | G06F 16/5866 |
| | | | 382/305 |
| 2016/0330160 A1 | 11/2016 | Shan et al. | |
| 2018/0262793 A1* | 9/2018 | Lau | H04N 21/43076 |
| 2021/0006519 A1 | 1/2021 | Taitz et al. | |
| 2021/0409392 A1 | 12/2021 | Sung | |
| 2022/0214785 A1 | 7/2022 | Giv | |
| 2023/0129726 A1* | 4/2023 | Narula | G01S 13/4454 |
| | | | 342/458 |
| 2023/0176804 A1* | 6/2023 | Ryu | H04N 21/439 |
| | | | 345/2.2 |
| 2024/0015345 A1 | 1/2024 | Grigore | |
| 2025/0004690 A1 | 1/2025 | Dasher et al. | |

FOREIGN PATENT DOCUMENTS

| | | | | |
|---|---|---|---|---|
| WO | WO-2011081777 A1 * | 7/2011 | | H04L 67/52 |
| WO | WO-2014182043 A1 * | 11/2014 | | H04L 67/06 |
| WO | 2022025463 A1 | 2/2022 | | |
| WO | WO-2023015152 A1 * | 2/2023 | | G06V 10/95 |

* cited by examiner

SYSTEMS AND METHODS FOR DYNAMICALLY SHARING MEDIA BASED ON CONTACT PROXIMITY, GROUP PARTICIPATION, OR EVENT

FIELD OF INVENTION

Embodiments of the present disclosure relate to dynamically sharing media items, such as images and photos, audio files, ringtones and the like, between electronic devices based at least on occurrence of a triggering event, such as birthday, or satisfaction of a triggering condition, such as a proximity of devices, and forming groups such that an image loaded to a shared camera is viewable by all members of the group and an image viewed by one member of the group is simultaneously viewed by all members of the group that signed in to a viewing session.

BACKGROUND

Taking pictures with electronic devices has been on the rise since the popularization of smart-phones and smart devices. With a high resolution camera at their fingertips, individuals routinely take several photos when with friends and family. People like to feel connected to their friends and family, and taking and sharing these photos with them enhances their experiences and relationships. There are times when a group of individuals are having an experience together and, increasingly, this involves the use of devices such as mobile phones, wearables, and other emerging devices to take a picture, record a video, or capture audio.

In many settings, whether the picture is taken in a selfie mode or someone else takes a picture of a group of friends, colleagues, family, schoolmates, etc., once a photo is taken on an individual's phone, often several people that were part of the photo will ask, "Hey, can you share that photo with us?"

Current sharing tools in the art allows the individual who took the picture to share it via various methods such as SMS, iMessage, email or through a cloud service such as iCloud™ Photos, or Facebook™. Users may also create an album, such as on Google Photos™, and share a link to the album with others that were in the photo as a tool to share their memories.

Users may also share wallpaper, which may contain widgets, or a layout including a graphic image using the same methods, i.e., SMS, iMessage, email, cloud service such as iCloud™ Photos, Facebook™, or link to a Google Photo™ album.

One problem with the current methods is that they are cumbersome and require several steps to share a photo. For example, a user taking a group photo with eight other people will have to select the photo in their phone's photo library, select each individual separately to send the photo, choose a method, such as SMS or other methods described above, and then send the photo. Often due to the cumbersome steps required and the time involved, the individual taking the photo resorts to not sending the photo immediately to all the eight other people and instead waiting till they have some free time to send it.

Even posting a picture on a shared group, such a WhatsApp™, Facebook™, Google™ shared album, or Messenger group, has its own drawbacks. For example, people need to join or be invited to the shared group, and once they are invited and accept the invitation, then photos can be shared. Such shared groups lack spontaneity and still requires the same cumbersome efforts on the user's part to create a group, select picture, add contacts to the group and then share the photos.

Another problem with the current methods is that the individuals often forget to send the photo or don't recall all the eight individuals in the photo, thereby having to look at the photo and then select their contacts to send the photo.

A further problem with the current methods is that the photo received stays in the receiver's SMS feed or other medium used by the individual to transmit the photo. Since it stays in the transmitted medium, it many cases the receiving party cannot find it easily, as they forget which medium to search for the group photo.

As such, there is a need for methods and systems that overcomes some of the above-mentioned problems and provide an enhanced media sharing experience.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
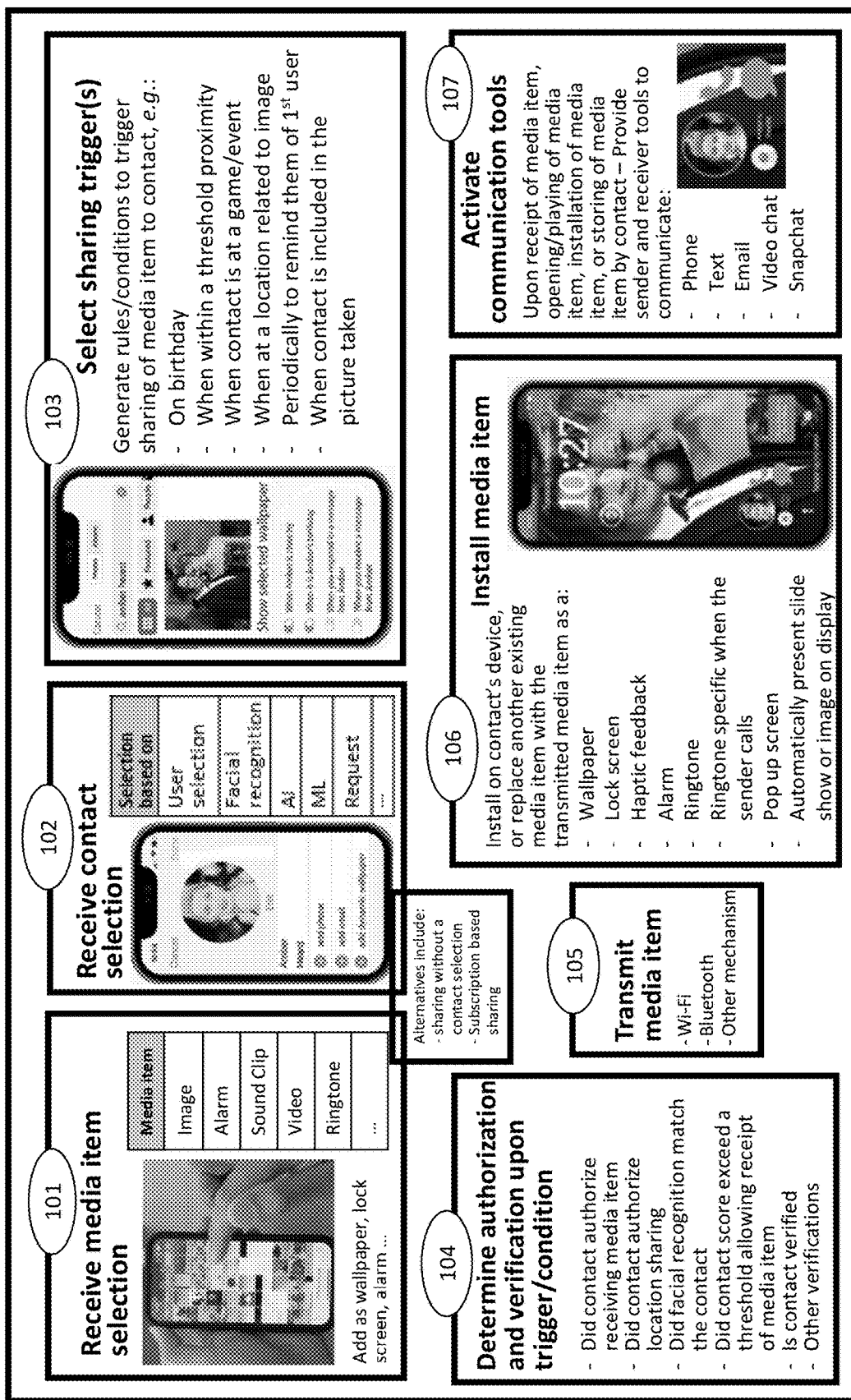
FIG. 1 is a block diagram of an example of a process for sharing media with another electronic device based on an activation trigger, in accordance with some embodiments of the disclosure.

In accordance with some embodiments disclosed herein, some of the above-mentioned limitations are overcome by dynamically sharing a media item with a contact based on satisfying a trigger condition. As referred to herein, a trigger may also be referred to as a condition, such as a first or second condition. In other embodiments disclosed herein, some of the above-mentioned limitations are also overcome by enabling a shared camera to automatically send a picture captured by a member of a group to all members that have joined the same group. In yet another embodiment, once a shared camera is enabled, the system automatically identifies individuals present in a media item and automatically shares the media item with them after cross-referencing or that the individual in the picture is the same individual with whom the media item is being shared (such as based on Face ID hashes).

With respect to dynamically sharing a media item based on satisfying a trigger condition, in one embodiment, the methods include receiving a selection of a media item, such as a photograph or video depicting one or more individuals, an alarm, a ringtone, haptic feedback, or some other sound clip. Alternatively, instead of first receiving a selection of a media item, the methods include receiving a selection of a contact that is stored in an address book related to an electronic device, such as a contact stored in a contacts list or address book of a mobile phone.

In another embodiment, a media item may not depict individual(s) with whom the media item is to be shared. In an example of this embodiment, the methods include determining that a trigger condition (also referred to as a condition) is satisfied, and in response, automatically sharing the media item with contacts that have agreed (or subscribed) to receiving the media item, such as receiving a wallpaper from a sports team and having it updated on their electronic device.

As used herein, trigger, triggering condition, trigger condition, trigger event, and triggering event are used interchangeably and are meant to have the same meaning in which satisfying of the event or condition is what triggers the next step in the process, such as sharing of a media item.

In some embodiments, if a media item is selected first, then individuals in the media item are identified and compared with contacts in the address book. The comparison may be performed based on facial recognition and hash calculations. The contacts that are identified as being in the media item are then selected for sharing the media item. For example, if the media item, such as a photograph, depicts John, Sally, and Michael, and the address book includes John and Sally as contacts of the user that took the photograph, then both John and Sally are selected as contacts and the photograph is shared with them.

In some embodiments, if a contact is selected first, then all media items, such as photos and videos, in which the contact is depicted are identified as media items that can be shared with the contact. Relating the media items to the contact selected may involve performing facial recognition and hash calculations.

The methods make it possible for people depicted in a photograph to automatically receive the photograph once it is taken without the system having to ask the user that took the photograph to send it to them and without requiring the user that took the photograph to perform cumbersome steps to separately send the photograph to each person depicted in the photograph.

Regardless of the order of selection, i.e., a) media item first resulting in displaying contacts in the image for selection for sharing or b) the contact in the address book first resulting in a displaying all media items stored in the electronic device (or at a remote storage location) that depict the contact, have the contact's voice or bear some relationship to the contact, once a selection of contact and media item is made, the methods allow the user of the electronic device to select a trigger condition for sharing the media item. The trigger condition can be created by the user or suggested by control circuitry of the system, such as the system in FIG. 2. The trigger condition may also be suggested based on analysis performed by an artificial intelligence (AI) or machine learning (ML) algorithm.

Satisfying the triggering condition for the sharing of the media item is what allows the sharing of the media item with the selected contacts. If the trigger condition is satisfied, then the media item is shared with the contact; if it is not satisfied, then the media item is not shared with the contact.

The trigger condition may be based on a triggering event. The triggering event may be a contact's birthday, anniversary, or any special occasion. It may also be just a date that is important to the contact, or a date or time related to the contact.

The triggering condition may also be proximity of the contact to the user, for example. If that is the triggering condition, then the system may analyze whether the current location of the contact's electronic device is within a predetermined distance of the current location of the user's electronic device. Having proximity as a condition allows users to share media items with other users a) that are their contacts or otherwise with whom they share some relationship b) while they are within a threshold distance of the user. For example, a family of five walking around the Eiffel Tower may have their electronic devices within a proximity of each other, which allows any member of the family to share an image with all five family members based on the trigger condition of proximity within a threshold distance being satisfied. That would allow the family to share pictures that are relevant to each other while they are around the Eiffel Tower. In the same example, if a sixth family member did not make the trip to Paris and is located in New York, although they are a contact, they will not satisfy the proximity triggering condition, assuming that the threshold set for proximity is within a few feet, yards, or miles of the user's electronic device. In one embodiment, the proximity condition may be set such that it determines proximity of the contact to the user's device, and in another embodiment, the proximity condition may anchor the origin from where proximity is to be determined based on selected coordinates, a landmark, an address, etc.

In order to determine the location and proximity of the contacts' electronic devices, permission may be sought to protect their privacy such that a person's location is not disclosed unless they have authorized the sharing of the location.

Once the media item is shared with the other users/contacts, the methods may automatically enable/install the media item on each contact's electronic device. For example, if the media item is a photograph, the system may replace an existing wallpaper or lock screen on the electronic device of the contact with the shared photograph. The system also activates communication tools such that when another user views the photo, they are able to communicate with the person sharing the photo to enhance the photo-sharing experience.

With respect to enabling a shared camera to auto-send a picture captured by a member of a group to all members that have joined the same group, the systems and methods disclosed detect activation of a shared common camera on a first user device. The methods then identify contacts of the first user device that are advertising that they have activated a shared camera on their electronic devices. The methods also determine the proximity of the contact's electronic devices to determine whether they are within a threshold distance of the first user device. In order to determine the location and proximity of the contacts' electronic devices, permission may be sought to protect their privacy such that a person's location is not disclosed unless they have authorized the sharing of the location.

A shared camera, which includes information relating to the identification of all the users that are contacts of the first user device that a) have activated a shared camera on their electronic device and b) are within a predetermined distance from the first user device, is saved. The media items, such as photographs, of the shared camera may be saved locally or on a cloud storage.

A group may be formed for the contacts that satisfy both of the conditions above. An image captured by the first user device may then be saved on the shared camera's roll such that it is available for viewing, editing, and forwarding for all the members of the group. All photos uploaded to the shared camera roll may be stored by any member on their device, and they may be given full rights to the stored images.

In some embodiments, once shared, any of the members of the group, who is not the original author or creator, may be able to edit or delete a locally saved copy of the roll. Various rules that are agreed upon with the members of the group may be created and implemented, such as the member cannot edit or delete the original copy and can only edit or can delete their own local copy. The rules may allow edits if all members, or a majority of members, allow the edit. The rules may require approvals from members and allow other users to propose edits prior to them being implemented in the original copy.

Any member of the group may initiate a shared viewing session. They may invite other members to accept the invitation to the shared viewing session. For members that accept the invitation, any image viewed on the device of the person presenting in the shared viewing session may simultaneously and in real time be viewed by all the members in the group. The system may also activate communication tools such that individuals in the shared viewing session may interact with each other, thereby enhancing their photo-sharing experience.

Proximity, as described herein may be between two device or from a location or specific place. In some embodiments, proximity may be determined based on whether a second electronic device is within a predetermined distance from a first electronic device. In other embodiments, a location, such as Chicago, or more specific location that refers to a part of a city, such as Manhattan, or Broadway Street, may be identified and proximity may be determined based on a predetermined distance between the location and the electronic device. In yet other embodiments, proximity may be based on a specific monument, address, place, such as Eiffel tower, 45 Rockefeller Plaza, New York, NY etc. and proximity may be determined based on the predetermined distance between the specific monument, address, place and the electronic device.

FIG. 1 is a block diagram of an example of a process for sharing media with another electronic device based on an activation trigger, in accordance with some embodiments of the disclosure.

Figure 2:
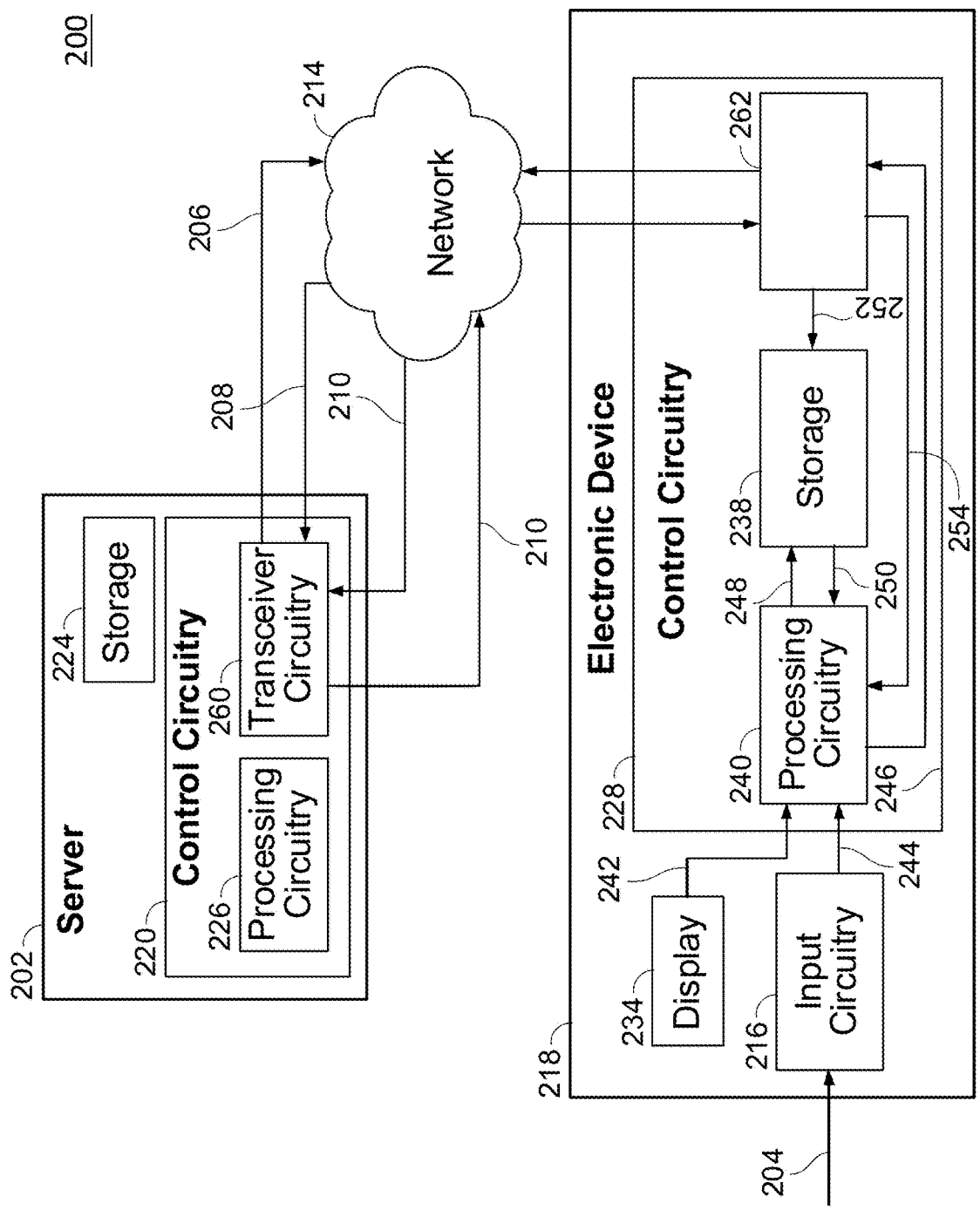
FIG. 2 is a block diagram of an exemplary system for sharing media items between electronic devices based on satisfying a trigger condition, in accordance with some embodiments of the disclosure.

In some embodiments, at block 101, control circuitry of a system, such as control circuitry 220 and/or 228 of system 200 in FIG. 2, receives a selection of a media item. The receiving of the selection may be in response to a user selecting a media item on their electronic device, such as a mobile phone, laptop, tablet, smart camera, smart watch, mixed-reality device, or any other electronic device capable of storing a media item and/or taking a picture or recording a video through a camera or capturing an audio sound.

The media item may include an image, such as a photograph taken by a camera, such as a smart camera, or a connected DSLR camera, of the user's electronic device, an image stored in the user's electronic device, or an image received by the user on their electronic device, such as via an SMS. The media item may also be a voice note or voice file, such as a recorded voice note or an MP3, WAV, or any other voice file format.

The media item may also be a logo, GIF, or an image of a sports team. It may also be a logo, GIF, or an image of a celebrity, a monument or historic place, a tourist attraction, a company, an educational institution, or any other entity.

Figure 15:
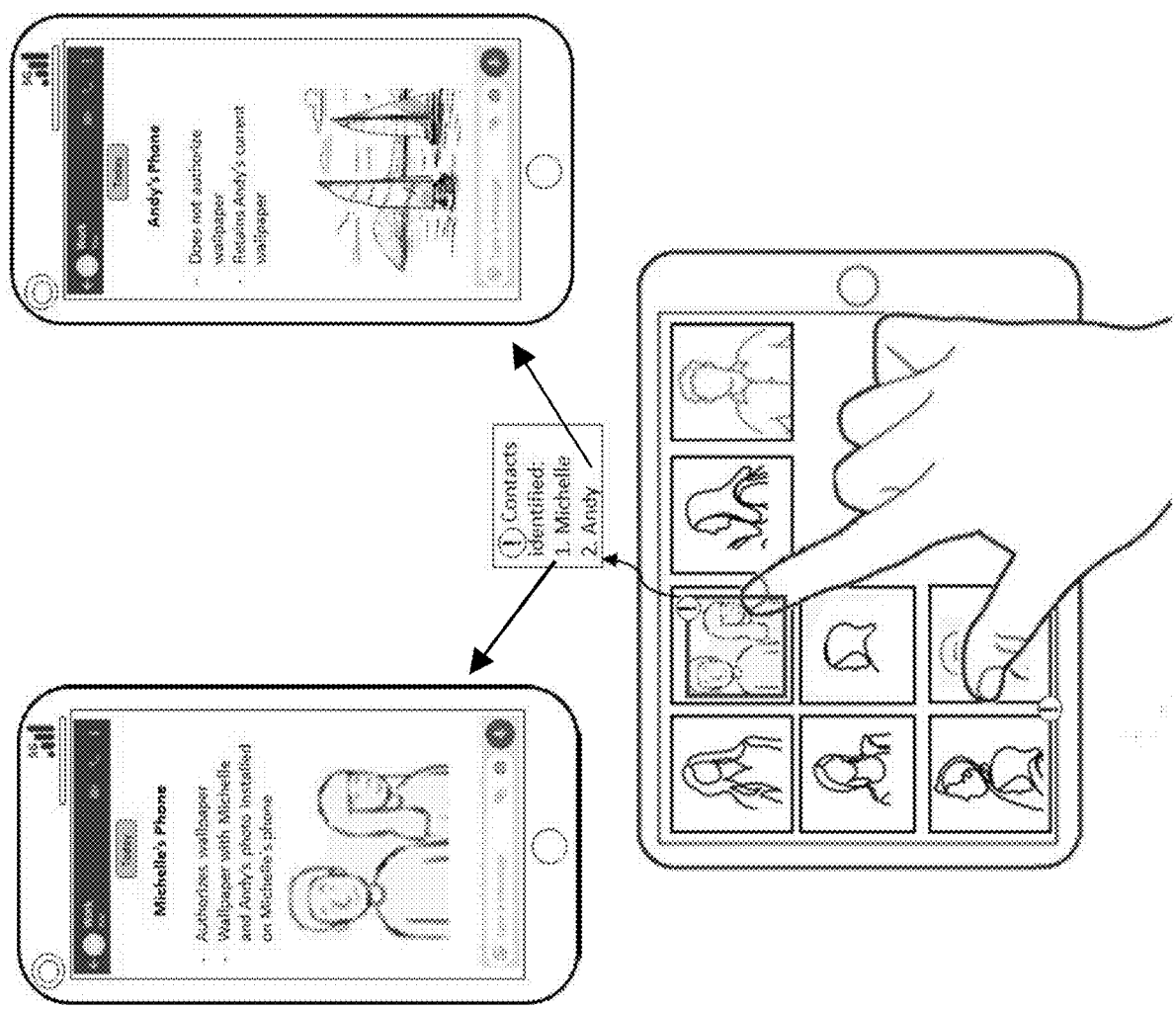
FIG. 15 is an example of sharing a media item with multiple users based on sharing permissions granted by each user, in accordance with some embodiments of the disclosure.

The media item may also be a video, alarm, ringtone, GIF, notification, a type of haptic feedback, or any other type of digital file as further described in FIG. 15. In some embodiments, the media item may also be an item in the extended reality or metaverse. It may also be a non-fungible token (NFT). In yet other embodiments, the media item may be a document.

In some embodiments, the control circuitry 220 and/or 228 may receive the media item on an electronic device from a source external to the electronic device, such as media item sent to the electronic device by another person or downloaded from the internet. In another embodiment, the media item may be created on the electronic device by the user. For example, the user may take photographs using the camera of the electronic device, record voice notes, or create videos, music, sounds, or other type of media items, including audible media, using tools downloaded on the electronic device.

At block 102, the control circuitry 220 and/or 228 receives a selection of a contact. In some embodiments, the user of the electronic device may be using a mobile phone that includes a plurality of contacts in its address book. The user of the electronic device may select one or more contacts from the address book with an intention to send the selected media item to the selected contact. The user of the electronic device may also select a large group of people to share the media item via a text message or an email.

Although an address book has been discussed in the embodiments, the scope of the disclosure is not so limited. The methods described herein are also applicable when a person with whom the media item is to be shared in not a contact of the user or not in their address book. For example, when a person is included in a photograph, or an object associated with the person is depicted in the photograph, such as their dog, their personal item, their car etc., then various techniques may be used to identify the person and share the media item with them. For example, a social media search, a public records search, an internet search, search on various online platform, etc., may be performed to identify the person and share the photograph with them.

In another embodiment, the control circuitry 220 and/or 228 may invoke an artificial intelligence (AI) algorithm to select a contact from an address book associated with the electronic device. The AI algorithm, in some embodiments, may analyze the media item selected at block 101 and determine that a contact in the address book is or should be associated with the media item and accordingly select that contact from the address book for receiving the media item. For example, if an AI engine associated with the electronic device executing an AI algorithm determines that the media item is a photograph and the individual depicted in the photograph is a contact stored in the address book of the electronic device, then the AI algorithm may automatically select that contact that are depicted in the photograph.

In yet another embodiment, the control circuitry 220 and/or 228 may auto-tag individuals, such as friends and family, on social media platforms, and use the tagging to share the media items.

In another example, if the AI engine associated with the electronic device executing an AI algorithm may determine that the media item should be shared with contacts, other than the contact depicted in the photo, that are stored in the address book of the electronic device, then the AI algorithm may automatically select those contacts. For example, the AI algorithm may determine that a photograph of an individual receiving an award should be shared with the individual's parents, colleagues, and close friends. Other types of media items, such as media items related to work, may be determined by the AI algorithm to be shared with individual's boss or colleagues, even if they are not depicted or mentioned in the media item. The AI algorithm may, in some embodiments, automatically select contacts that it determines should be informed of the media item, or the AI engine may provide a recommendation to the user of the electronic device to select the contacts and provide reasoning for such selection. In yet other embodiments, the AI algorithm may determine the nature of a relationship between a user and a contact and based on the relationship, automatically select or suggest the person as a contact for sharing the media item.

In another embodiment, the control circuitry 220 and/or 228 may invoke a machine learning (ML) algorithm to select a contact from an address book associated with the user's electronic device. In this embodiment, a machine learning engine invoking the ML algorithm may gather data based on previous selections by the user of the electronic device of contacts for certain types of media items. Such historical information may be used to detect a pattern. When a new media item is selected, it may be checked to determine if it falls within the pattern detected, and if so, the ML algorithm may automatically suggest to the user to select certain contacts or may automatically make the selection without seeking user input. For example, if a user of the electronic device typically forwards photographs of their children to their spouse, then, for a photo of the user's children, the algorithm may automatically suggest adding the individual's spouse as a contact. In another example, based on the pattern detected, if the individual has historically shared photographs or videos of their tennis matches to a coach, then for a video of the user's tennis match, the ML algorithm may automatically select the coach as a contact. In another embodiment, instead of suggest adding the individual's spouse or coach, the algorithm may automatically forward the media items to the spouse or coach once the trigger conditions are met.

In yet another embodiment, the control circuitry 220 and/or 228 may invoke an algorithm to generate face ID signatures for the individuals depicted in the media item. The user's electronic device, or a server, may then provide one or more hashes it computes from the media item, such as a photograph, to the receiving electronic device. Upon receiving the one or more hashes, the receiving electronic device, such as the contact's device, may compare the hashes with the lists of receivable hashes and responds with its own hash to trigger the user's device to send it the media items. In some cases, there may be contacts registered for the receiving the media item and multiple devices may compare the received hashes from the user's device with the lists of receivable hashes and responds with its own hash to the user's device. Such mechanisms of hash sharing, hash verification, allows for a secured way to use face ID hashes as shared cryptographic secrets without exposing them so that a positive answer cannot be spoofed. In other words, the wrong person cannot claim that they are in fact the person in the picture and request to receive the photograph.

In some embodiments, blocks 101 and 102 may be interchangeable. For example, a contact may be selected first, and then a media item that is to be shared with the contact may be selected. In another embodiment, the media item may be selected first, and then subsequently the contact with whom the media item is to be shared may be selected.

At block 103, the control circuitry 220 and/or 228 may receive a selection of a trigger. The trigger is a triggering event the occurrence of which allows the control circuitry 220 and/or 228 to share the media item selected at block 101 with the contact selected at block 102.

In some embodiments, the sharing of the media item, such as an image that is to be used to create or update wallpaper or lock screens, may be triggered based on certain events, such as a contact's birthday. In other embodiments, the sharing of the media item with the contact, such as an image that is to be used to create or update wallpaper or lock screens, may be triggered based on the shared location and proximity of the contact's device.

In yet another embodiment, the sharing of the media item may be triggered based on events such as the contact's preferred sports team winning a game or whenever the team is playing. In some embodiments, control circuitry 220 and/or 228 may monitor the real-time score of a favorite sporting event and use such external triggers to share media items related to the sports team.

Although some examples of triggers have been described above, the user may choose to trigger the change in the display of the wallpaper based on several factors that are not limited to the contact's birthday, a shared event from a calendar, or when the contact's device is within a certain proximity (as reported based on location services (GPS coordinate-sharing or location-sharing as is known in the art). For example, the user may desire to change their wallpaper frequently, on certain days of the week, days of the month, during daytime or nighttime, or on some other periodic interval.

In some embodiments, triggers may also be based on a time interval (for example, daily), on a metric (for example, every five times the user unlocks their mobile device), or even on an external event (for example, whenever the user's favorite band is in town or whenever their college football team has a game).

Several types of rules or conditions to trigger the sharing of the media item with the contact may be generated as desired. In some embodiments, the user of the electronic device may generate their own rules of when to trigger the process for sharing the media item with the contact. In other embodiments, the AI or ML algorithm may provide rule recommendations which when satisfied may trigger the sharing of the media item with the selected contact. Even home devices, such a Nest™ thermostat may be configured to provide rule recommendations which when satisfied may trigger the sharing of the media item with the selected contact. The Nest™ thermostat, or smart other home devices, may also be used as a trigger for sharing, for example, if the temperature in the house exceeds 90 F, share a wallpaper of an ice cream with the family, or when the power shuts off, share a predetermined wallpaper with the family that alerts them to call the electric company.

In this example, a user may configure any home automation device. Such as a smart home device that includes a thermostat, oven, iron, smoke alarm, home gas detection device, home security camera etc. The user may configure the trigger (also referred to as second condition) to a setting of the home automation/smart device. These setting may be used to provide the user a suggestion, a warning, or a high alert to inform the authorities. For example, in some embodiment, a home user may desire that ice cream wallpapers of images be shared with all contacts that that live in the same household when the home automation device reaches 90 degrees Fahrenheit. In other instance, if there is a fire alarm in the house, a gas leak, the iron or oven is left on when the occupants of a house have left the house, then the system may automatically send a wallpaper, certain ringtone or alert, of a video of the house to the second electronic device. In some embodiments, the first device may also be the home automation device in which al contacts of people that occupy the home are listed.

At block 104, the control circuitry 220 and/or 228 may determine whether an authorization to share was received prior to sharing the media item with the contact upon the occurrence of the trigger. In some embodiments, the authorization may be obtained by the control circuitry 220 and/or 228 once a media item has been identified to share with the contact, i.e., an authorization may be obtained each time there is a media item to be shared. In other embodiments, the control circuitry 220 and/or 228 may obtain authorization at one time and not seek authorization for each new media item.

Also at block 104, the control circuitry 220 and/or 228 may determine whether the recipient with whom the media item is to be shared has authorized sharing of their location with the user who wants to share the media item. As described earlier, one of the triggers for sharing a media item is proximity of another user, such as a second user. If the proximity is within a predetermined threshold distance, then that would trigger the sharing of the media item. On the other hand, if the second user did not authorize sharing their location, then the media asset may not be shared.

To determine proximity of the second user, the control circuitry 220 and/or 228 may use GPS, BLE or Wi-Fi positioning and other methods which are known in the art to obtain their location. In some embodiments, instead of the second user's device sharing GPS coordinates, due to privacy concerns, the second user' device may simply report on the presence and the control circuitry 220 and/or 228 may determine whether the presence is within the threshold proximity. For example, the second user's device may confirm that it is within a certain proximity, such as 3 miles, without giving exact location of where it is located within the 3 mile range. Whether it is sharing of coordinates, or simply acknowledging that the device is within a proximity, the permission of such location- or presence-sharing is obtained by the control circuitry 220 and/or 228 prior to sharing the media item.

In an embodiment where the contact is identified and verified based on a hash calculation. In this embodiment, the control circuitry 220 and/or 228 may invoke an algorithm to generate face ID signatures for the individuals depicted in the media item. The user's electronic device, or a server, may then emit one or more hashes it computes from the media item, such as a photograph, to the receiving electronic device. Upon receiving the one or more hashes, the receiving electronic device, such as the contact's device, may compare the hashes with the lists of receivable hashes and responds with its own hash to trigger the user's device to send it the media items. In some cases, there may be contacts registered for the receiving the media item and multiple devices may compare the received hashes from the user's device with the lists of receivable hashes and responds with its own hash to the user's device. Such mechanisms of hash sharing, hash verification, allows for a secured way to use face ID hashes as shared cryptographic secrets without exposing them so that a positive answer cannot be spoofed. In other words, the wrong person cannot claim that they are in fact the person in the picture and request to receive the photograph. Although one method of hash is described above, the methods are not so limited, and any other technique for performing a hash calculation is also contemplated.

In addition to authorization verification, proximity sharing authorization, and facial recognition verification, the control circuitry 220 and/or 228 may perform other types of verifications to ensure that the receiving device has authorized receiving of the media item and also verified that they are the intended recipient. The control circuitry 220 and/or 228 may also perform other types of verifications to ensures that an individual depicted in a photograph is correctly being associated with a contact in the address book, i.e., ensure the photograph of Amber Heard will be correctly recognized by the system with a contact of Amber Heard and not with another person. So, when a media item includes depiction of an individual, such as in an image in a photograph or video, and it is being associated with a contact from the user's electronic device is to share the media item, the verification ensures that the contact identified for sharing is in fact the individual depicted in the media item. Hash calculation is one method used to perform such verification, however, other types of verifications to accomplish the same may also be performed.

At block 105, the control circuitry 220 and/or 228 automatically shares the media item with the contact identified in block 102 by transmitting the media item to the contact. In some embodiments, the control circuitry 220 and/or 228 may use a Wi-Fi or Bluetooth connection to transmit the media item to the contact. In other embodiments, other methods of transmitting the media item that are commonly known may also be used.

At block 106, the control circuitry 220 and/or 228 may, in some embodiments, automatically enable or install the media item that has been shared on the electronic device of the contact selected at block 102. As described earlier, the media item may be a wallpaper, a lock screen image, haptic feedback, video, an alarm sound, a ringtone such as a specific ringtone associated with the specific individual that is sharing the media item, a pop-up screen with an image or information, or any other type of image, video, or audio file that can be installed on the electronic device of the contact selected. The media item may also be in the form of an applicative program. In another embodiment, the control circuitry 220 and/or 228 may provide an option for the user of the electronic device that is to receive the shared media item to install the item. In another embodiment, the control circuitry 220 and/or 228 may review the preferences set by the user of the electronic device that is to receive the shared media item. Based on the preferences, the circuitry 220 and/or 228 may determine which types of media items to automatically install on the user's electronic device and for which to seek user approval.

In some embodiments, the circuitry 220 and/or 228 may cause the second electronic device to provide an output based on the selected one or more media items from the first electronic device. In other words, it may automatically modify an existing wallpaper, ringtone, haptic feedback etc. on the second electronic device based on trigger or condition satisfaction. Providing an output, as referred to herein, is causing a wallpaper, ringtone, haptic feedback, video and any other media item mentioned herein, to be displayed on the electronic device, to replace another existing same type of media item, and/or, cause the activation of such media item, such as cause a ringtone to occur when outputted.

At block 107, the circuitry 220 and/or 228 may activate the electronic device's communication tools to allow the sender of the shared item and the recipient to communicate with each other. In this embodiment, the circuitry 220 and/or 228 may utilize existing communication tools that are associated with the electronic device, such as phone, text, email, video chat, Snapchat™ or any other communication means that allows the recipient of the media item to communicate with the sender of the media item. For example, a first user willing to share a photograph in which a second user is depicted may select the second user as a contact at block 102. Based on the sharing triggers (or conditions), authorizations, verifications, and installation processes discussed at blocks 103-106, once the photograph, such as a wallpaper, is enabled or installed on the second user's electronic device, the control circuitry 220 and/or 228 may automatically provide a selection option, such as via pop-up screen, to allow the second user to communicate with the first user. Such communication may allow both users to discuss the memory related to the photograph, thus enhancing both users' photo-sharing experience.

In some embodiments, the circuitry 220 and/or 228 may activate the communication tools each time the media item is activated, such as wallpaper is displayed, or audio file is played, on the electronic device. In other embodiments, the circuitry 220 and/or 228 may activate the communication tools only the first time the media item is activated. In yet other embodiments, the circuitry 220 and/or 228 may determine a prolonged gaze at the media item, such as a wallpaper or lock screen, and, based on the gaze exceeding a predetermined time, may activate the communication tools such that the user gazing can communicate with other users that are included in the media item. Since a user may have a prolonged gaze at the media item, such as a photo, because, for example, they are missing a person depicted in the media item, the control circuitry 220 and/or 228, by activating communication tools based on their prolonged gaze, allows the user to communicate with the other user at the time of missing the other user.

Figure 3:
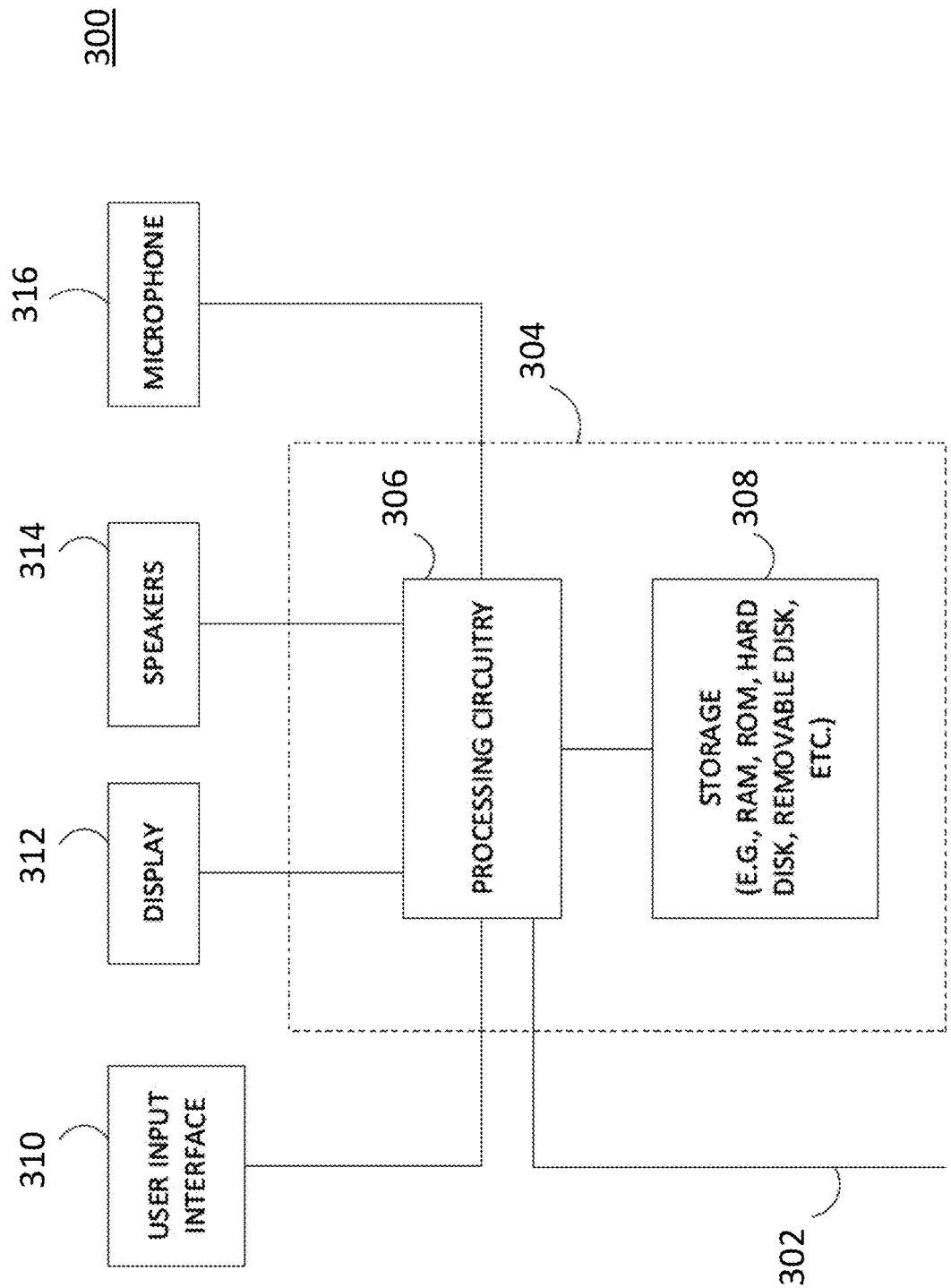
FIG. 3 is a block diagram of a user device used for sharing media between electronic devices based on satisfying a trigger condition, in accordance with some embodiments of the disclosure.

FIG. 2 is a block diagram of an exemplary system for sharing media items between electronic devices based on satisfying a trigger condition/condition, in accordance with some embodiments of the disclosure. FIGS. 2 and 3 also describe example devices, systems, servers, and related hardware that may be used to implement processes, execute user interface operations, and all other steps, functions and functionalities described at least in relation to FIGS. 1, 4-24. Further, FIGS. 2 and 3 may also be used for dynamically sharing a media item based on satisfying a trigger condition/condition, receiving a selection of a media item, receiving a selection of a contact, determining contacts based on media items selected, determining media items based on contacts selected, determining based on facial recognition that a selected contact is the person in the media item or is related to the media item in some manner, searching address book or contacts list of an electronic device, performing checksum calculations, generating triggering conditions, suggesting triggering conditions, determining whether the trigger condition has been satisfied, seeking permissions and authorizations for disclosing location of an electronic device to another user, enabling and installing the media item on the contact's electronic device, replacing older wallpapers and lock screens with the shared media item, activating communication tools to allow parties to communicate with each other when a shared media item is viewed, enabling a shared camera to auto-send a picture captured by a member of a group to all members that have joined the same group, identifying contacts of the first user device that are advertising that they have activated a shared camera on their electronic devices, determining proximity of the electronic devices to determine whether they are within a threshold distance of the first user device, identifying all the users that are contacts of the first user device that have a) activated shared camera on their electronic device and are b) within a predetermined distance from the first user device, saving the shared camera, saving images and camera rolls to the shared camera, allowing simultaneous viewing of images on the shared camera during a viewing session, sending invitations for contact to join the saved camera, sending invitations for contacts to join a viewing session, utilizing AI and ML algorithms for selecting media items, contacts, and detecting patterns of sharing, and performing functions related to all other processes and features described herein.

In some embodiments, one or more parts of, or the entirety of system 200, may be configured as a system implementing various features, processes, functionalities and components of FIGS. 1, 4A-4B, 5, 11, 15, 18-19, and 22. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as electronic device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content (e.g., media items, links to media items stored at remote storage, such as cloud storage, data relating to selections of media items, data relating to selection of contacts, trigger conditions, facial recognition information, address books, hash calculations, permissions and authorizations, data related to replacement of wallpapers and lock screens, shared camera, list of group members in the shared camera group, list of group members in the shared viewing group, camera rolls loaded to shard camera, locations of devices that are contacts of the electronic device, AI and ML algorithms). Non-volatile memory may also be used (e.g., to launch a boot-up routine, launch an app, render an app, and other instructions). Cloud-based storage may be used to supplement storages 224, 238 or instead of storages 224, 238. In some embodiments, data relating to media items, links to media items stored at remote storage, such as cloud storage, data relating to selections of media items, data relating to selection of contacts, trigger conditions, facial recognition information, address books, hash calculations, permissions and authorizations, data related to replacement of wallpapers and lock screens, shared camera, list of group members in the shared camera group, list of group members in the shared viewing group, camera rolls loaded to shard camera, locations of devices that are contacts of the electronic device, AI and ML algorithms, and data relating to all other processes and features described herein, may be recorded and stored in one or more of storages 212, 238.

In some embodiments, control circuitry 220 and/or 228 executes instructions for an application stored in memory (e.g., storage 224 and/or storage 238). Specifically, control circuitry 220 and/or 228 may be instructed by the application to perform the functions discussed herein. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response to determining that a first electronic device has activated a dynamic sharing mode to share media items with a contact, the control circuitry 228 may determine whether a trigger condition has been satisfied that allows permission to share the media item with a selected contact. It may also perform steps of processes described in FIGS. 1, 4A-4B, 5, 11, 15, 18-19, and 22, including determining whether triggering conditions have been satisfied, or shared camera has been activated on member devices, to allow sharing of media items.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as physiological data and cybersickness scores and input from primary devices and secondary devices, such as XR devices. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be an electronic device, a personal computer (PC), a laptop computer, a tablet computer, a WebTV box, a personal computer television (PC/TV), a PC media server, a PC media center, a handheld computer, a mobile telephone, a smartphone, or a device that can perform function in the metaverse, or any other device, computing equipment, or wireless device, and/or combination of the same capable of suitably determining selections of contacts and related media items and sharing the media item with the contact upon satisfying of a trigger condition. Control circuitry 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 218 is configured for dynamically sharing a media item based on satisfying a trigger condition, receiving a selection of a media item, receiving a selection of a contact, determining contacts based on media items selected, determining media items based on contacts selected, determining based on facial recognition that a selected contact is the person in the media item or is related to the media item in some manner, searching address book or contacts list of an electronic device, performing hash calculations, generating triggering conditions, suggesting triggering conditions, determining whether the trigger condition has been satisfied, seeking permissions and authorizations for disclosing location of an electronic device to another user, enabling and installing the media item on the contact's electronic device, replacing older wallpapers and lock screens with the shared media item, activating communication tools to allow parties to communicate with each other when a shared media item is viewed, enabling a shared camera to auto-send a picture captured by a member of a group to all members that have joined the same group, identifying contacts of the first user device that are advertising that they have activated a shared camera on their electronic devices, determining proximity of the electronic devices to determine whether they are within a threshold distance of the first user device, identifying all the users that are contacts of the first user device that have a) activated shared camera on their electronic device and are b) within a predetermined distance from the first user device, saving the shared camera, saving images and camera rolls to the shared camera, allowing simultaneous viewing of images on the shared camera during a viewing session, sending invitations for contact to join the saved camera, sending invitations for contacts to join a viewing session, utilizing AI and ML algorithms for selecting media items, contacts, and detecting patterns of sharing, and performing functions related to all other processes and features described herein.

Computing device 218 receives a user input 204 at input circuitry 216. For example, computing device 218 may receive data relating to a device selecting a contact and a media item for sharing when a trigger condition is satisfied.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, Wi-Fi, WiMAX, GSM, UTMS, CDMA, TDMA, 3G, 4G, 4G LTE, 5G, 5G sidelink (5G NR V2X), 6G, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, Wi-Fi, WiMAX, GSM, UTMS, CDMA, TDMA, 3G, 4G, 4G LTE, or other wireless transmission protocols.

Processing circuitry 240 may receive input 204 from input circuitry 216. Processing circuitry 240 may convert or translate the received user input 204 that may be in the form of voice input into a microphone. In some embodiments, input circuitry 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1, 4A-4B, 5, 11, 15, 18-19, and 22, respectively.

FIG. 3 is a block diagram of a user device used for sharing media between electronic devices based on satisfying a trigger condition, in accordance with some embodiments of the disclosure. In an embodiment, the equipment device 300, is the same equipment device 202 of FIG. 2. The equipment device 300 may receive content and data via input/output (I/O) path 302. The I/O path 302 may provide audio content (e.g., such as in the speakers of an XR headset). The control circuitry 304 may be used to send and receive commands, requests, and other suitable data using the I/O path 302. The I/O path 302 may connect the control circuitry 304 (and specifically the processing circuitry 306) to one or more communications paths or links (e.g., via a network interface), any one or more of which may be wired or wireless in nature. Messages and information described herein as being received by the equipment device 300 may be received via such wired or wireless communication paths. I/O functions may be provided by one or more of these communications paths or intermediary nodes but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 or i9 processor). In client-server-based embodiments, the control circuitry 304 may include communications circuitry suitable for dynamically sharing a media item based on satisfying a trigger condition, receiving a selection of a media item, receiving a selection of a contact, determining contacts based on media items selected, determining media items based on contacts selected, determining based on facial recognition that a selected contact is the person in the media item or is related to the media item in some manner, searching address book or contacts list of an electronic device, performing hash calculations, generating triggering conditions, suggesting triggering conditions, determining whether the trigger condition has been satisfied, seeking permissions and authorizations for disclosing location of an electronic device to another user, enabling and installing the media item on the contact's electronic device, replacing older wallpapers and lock screens with the shared media item, activating communication tools to allow parties to communicate with each other when a shared media item is viewed, enabling a shared camera to auto-send a picture captured by a member of a group to all members that have joined the same group, identifying contacts of the first user device that are advertising that they have activated a shared camera on their electronic devices, determining proximity of the electronic devices to determine whether they are within a threshold distance of the first user device, identifying all the users that are contacts of the first user device that have a) activated shared camera on their electronic device and are b) within a predetermined distance from the first user device, saving the shared camera, saving images and camera rolls to the shared camera, allowing simultaneous viewing of images on the shared camera during a viewing session, sending invitations for contact to join the saved camera, sending invitations for contacts to join a viewing session, utilizing AI and ML algorithms for selecting media items, contacts, and detecting patterns of sharing, and performing functions related to all other processes and features described herein.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 308 may be used to store various types of content, (e.g., media items, links to media items stored at remote storage, such as cloud storage, data relating to selections of media items, data relating to selection of contacts, trigger conditions, facial recognition information, address books, hash calculations, permissions and authorizations, data related to replacement of wallpapers and lock screens, shared camera, list of group members in the shared camera group, list of group members in the shared viewing group, camera rolls loaded to shard camera, locations of devices that are contacts of the electronic device, AI and ML algorithms). Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the electronic device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the electronic device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech.

The electronic device 300 may include an interface 310. The interface 310 may be any suitable user interface, such as a remote control, mouse, trackball, keypad, keyboard, touchscreen, touchpad, stylus input, joystick, or other user input interfaces. A display 312 may be provided as a stand-alone device or integrated with other elements of the electronic device 300. For example, the display 312 may be a touchscreen or touch-sensitive display. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 310 may be HDTV-capable. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The equipment device 300 of FIG. 3 can be implemented in system 200 of FIG. 2 as primary equipment device 202, but any other type of user equipment suitable for allowing communications between two separate user devices for performing the functions related to implementing machine learning (ML) and artificial intelligence (AI) algorithms, and all the functionalities discussed associated with the figures mentioned in this application.

Figure 4A:
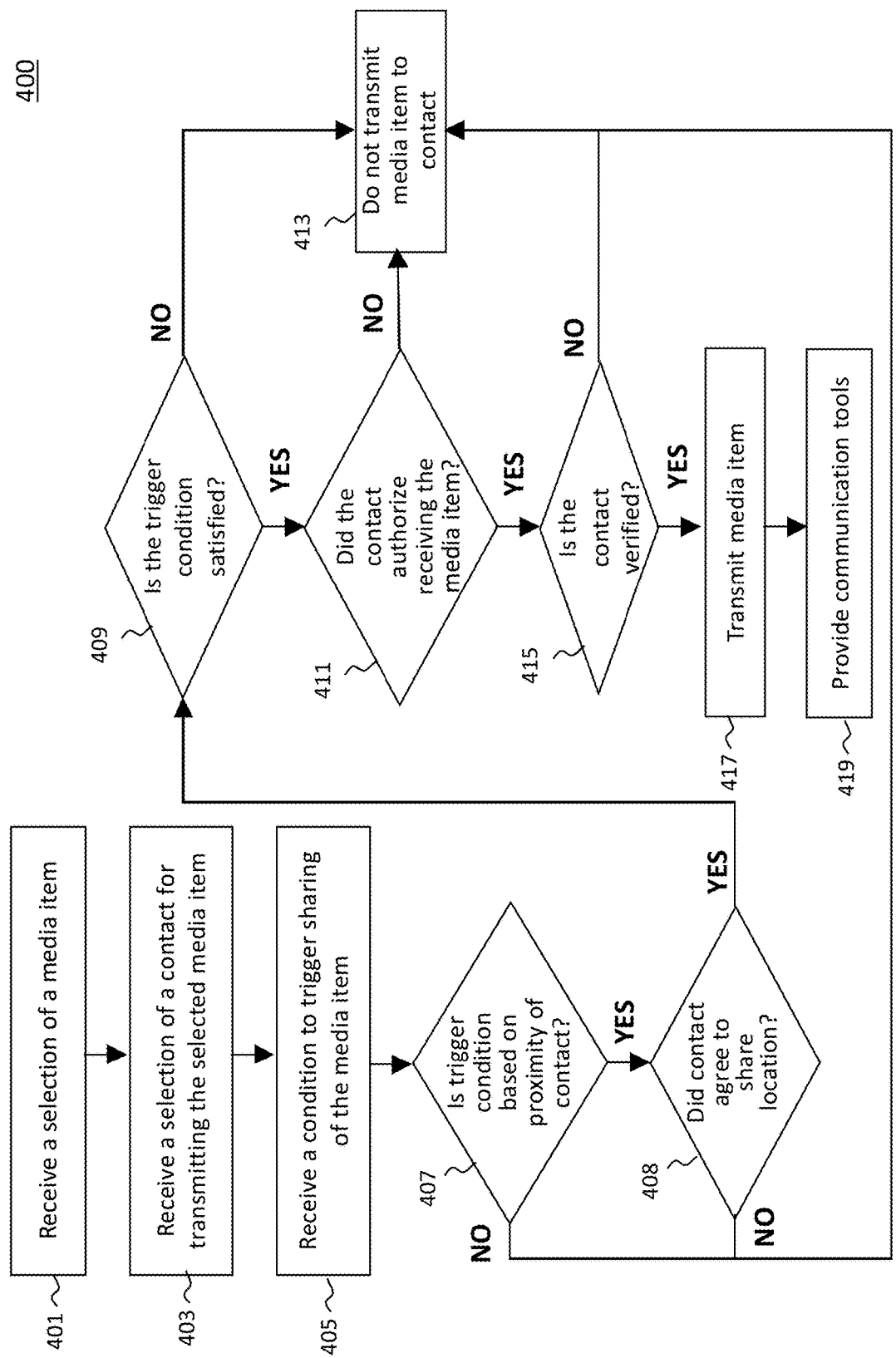
FIG. 4A is a flowchart of a process for sharing media with another electronic device based on an activation trigger, in accordance with some embodiments of the disclosure.

FIG. 4A is a flowchart of a process for sharing media with another electronic device based on an activation trigger, in accordance with some embodiments of the disclosure. In some embodiments, process 400 may be used to allow a user to add a dynamic wallpaper to a contact within their electronic address book. The user may do so by editing or creating a contact and choosing to add a dynamic wallpaper, such as described at block 102 of FIG. 1. Although an example of wallpaper is given to explain the process, the embodiments are not so limited, and the process may be applied to any media item, such as examples of media items depicted in FIG. 15.

In some embodiments, when adding the wallpaper, the user selects the contact or person. For example, the electronic device used by the user may include functionality to select images based on the selected person using an image recognition technique that allows the electronic device to display all images associated with the selected person.

The user may choose a particular image, a selection of images or simply any image associated with the person (contact). Further, the user may choose to trigger the display of the wallpaper based on several factors such as but not limited to the contact's birthday, a shared event from a calendar, or the presence of the contact's device within a certain proximity (as reported based on location services, such as GPS coordinate-sharing or location-sharing). Due to privacy concerns, it may be beneficial to simply report on the presence of the electronic device within a proximity rather than the GPS coordinates. Upon notification of the trigger (e.g., birthday, calendar event or presence) the electronic device may display or incorporate the selected image(s) into the wallpaper, lock screen or background content.

In some embodiments, when the wallpaper is displayed, the control circuitry 220 and/or 228 may indicate the proximity of the contact. The control circuitry 220 and/or 228 may also allow further actions associated with the contact, such as viewing the image within the image-viewing application, contacting the contact via phone or text, requesting the current location of the contact, and/or using other communication tools allowing both users to communicate with each other.

In some embodiments, due to privacy concerns, permission from the user may need to be obtained prior to sharing location and proximity information relating to the user. In some instances, when the first user enables proximity-based triggers, the permission may be obtained and used for subsequent sharing. In some embodiments, sharing of location may have been pre-approved, such as when the contact has been added to a "friends" or "family" grouping where participants have already given their approval for location information to be shared or when the electronic device whose location information is to be shared is owned or managed by the first user or registered within the first user's device management application (such as with a parent managing their children's devices).

In some embodiments, dynamic wallpaper based on contacts may be shared from one device to another based on a first user selecting a contact from a group of contacts with whom they wish to share wallpaper and a second user receiving a notification with a request for dynamic wallpaper-sharing indicating the requestor (the first user). In this embodiment, the second user may accept the request and grant authorization to the first user to share. The first user setting may also include preferences to indicate under what circumstances to share dynamic wallpaper. The control circuitry 220 and/or 228 of the electronic devices, detecting that a condition for sharing has been met (such as but not limited to proximity or a shared calendar entry), may allow the first device to transmit the graphic image or wallpaper configuration to the second device. Upon receiving the transmitted image, the current wallpaper on the receiving device, if any, may be replaced with the shared wallpaper configuration or graphical image.

In another embodiment, a first user may share their wallpaper with or request wallpaper from a second user when they have enabled dynamic wallpaper, which is a wallpaper that can be dynamically changed as new wallpapers are received. In this embodiment, an electronic device belonging to a contact or within a contact group, such as a favorites group, is detected to be in proximity to the second user's device. Based on the trigger condition of proximity being satisfied, the control circuitry 220 and/or 228 of the electronic device associated with the first user may transmit the wallpaper to the second device.

In another embodiment, devices may subscribe to a dynamic wallpaper feed that may automatically (if allowed or enabled by the user) change the wallpaper graphic or configuration. This change to the user's wallpaper may be triggered on a timed basis (for example, daily), on a metric (for example, every five times the user unlocks their mobile device) or on the occurrence of an external event (for example, whenever the user's favorite college football team has a game, or the wallpaper changes every time the score changes to reflect the change in the game).

These and other embodiments may be enabled based on the process 400 displayed in FIG. 4A. Accordingly, as depicted at block 401, in some embodiments, control circuitry 220 and/or 228 may receive a selection of a media item. The media item may be any one or more of the media items depicted in FIG. 15.

At block 403, in some embodiments, control circuitry 220 and/or 228 may select one or more contacts in the address book of the electronic device. The control circuitry 220 and/or 228 may select the contact(s) so that the selected media item at block 401 may be shared with the contact(s).

In other embodiments, the control circuitry 220 and/or 228 may invoke an AI algorithm to select a contact from the address book of the electronic device. In yet other embodiments, the control circuitry 220 and/or 228 may invoke an ML algorithm to detect a pattern and then make a suggestion for selecting a contact from the address book of the electronic device. In yet other embodiments, the control circuitry 220 and/or 228 may invoke a facial recognition or image recognition algorithm such that it may select all of the contacts depicted in the selected media item from the address book of the electronic device. In other embodiment where an address book does not include the person identified in the picture, or the person is not identified, then the control circuitry 220 and/or 228 may use various techniques to identify the person, such as by performing a social media search, a public records search, an internet search, search on various online platform, etc., to identify the person and share the photograph with them.

When the AI algorithm is invoked, in some embodiments, it may analyze the media item selected and determine which contacts in the address book are or should be associated with the media item. Accordingly, the AI algorithm may make suggestion of which contacts to add. For example, if the media item is a photograph and the individuals depicted in the photographs are contacts stored in the address book of the electronic device, then the AI algorithm may automatically select those contacts that are depicted in the photograph.

In some embodiments, the AI algorithm may also make suggestions for contacts to be added that are not depicted in the photograph in some embodiments. For example, the AI algorithm may determine that a photograph of an individual should be shared with family and certain individuals that are in close proximity to the user. The AI algorithm may also determine that certain individuals are on the preferred list in the user preferences and the user has previously shared similar content with them An ML algorithm may be used to select a contact from an address book based on gathering data based on previous selections of contacts by the user for certain types of media items. Such historical information may be used to detect a pattern of sharing with each individual contact and used to make recommendations for adding contacts to whom to send the selected media item.

In another embodiment, when a facial recognition algorithm is used to select a contact from an address book, it may be based on recognizing that individuals depicted in the photograph, video, etc., should be included in the sharing list. One example of using facial recognition to select a contact is depicted in FIG. 15.

Figure 6:
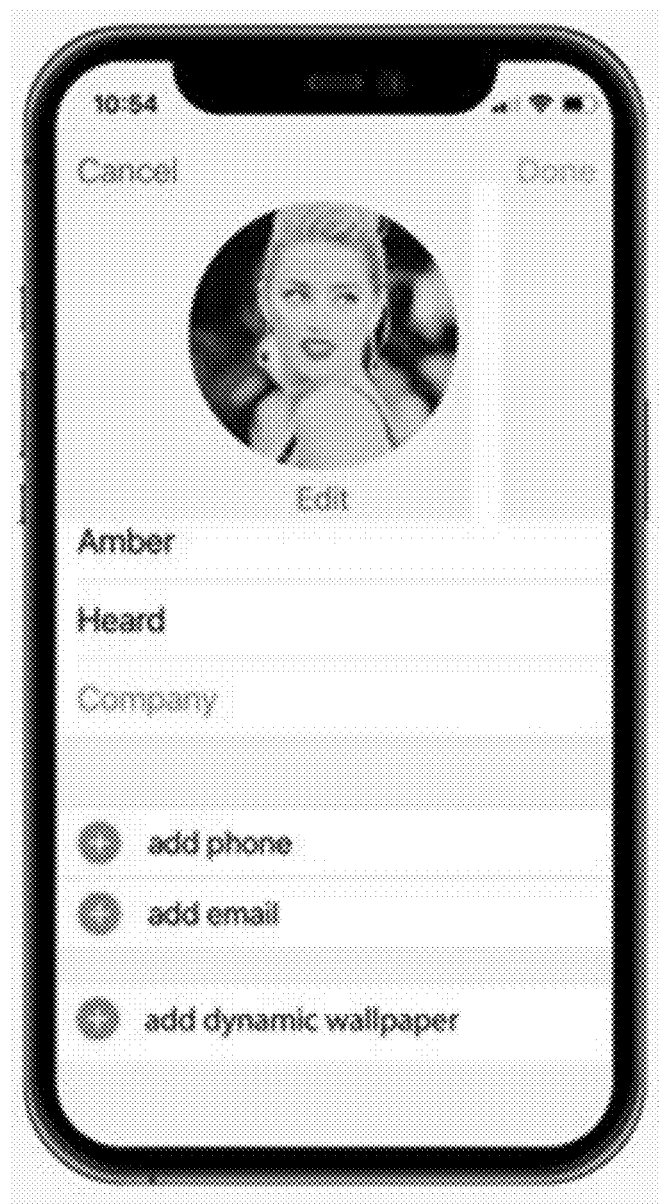
FIG. 6 is an example of selection of a contact in the electronic device's address book for sharing a media item, in accordance with some embodiments of the disclosure.

In another embodiment, although not shown in the figure, the process may start with block 403 and then continue to block 401, 405 and so on. In other words, a contact may be selected first and then the media item that may be associated with the contact is selected. As depicted in FIG. 6, the control circuitry 220 and/or 228 may provide a user interface on the electronic device for the user to select the contact. As depicted in FIG. 6, in this example, the user has selected Amber Heard as a contact with whom to share a wallpaper.

The contact to select with whom to share the media item may already be stored in an address book of the electronic device. In another embodiment, the user may also select a contact by editing or creating the contact and saving it to the address book or just entering their information for the purposes of sharing the media item and not saving the contact. Once the contact selection is made, the control circuitry 220 and/or 228 may display all images associated with that contact. For example, if John is selected as the contact, all images and media items associated with John, such as pictures of John, videos in which John is included, media items in which John may be interested, audio of John's voice, audio of other people mentioning John, and any other media items that are stored in the memory of the electronic device or can be accessed by the electronic device via a remote storage, may be displayed on the user interface of the electronic device. The user may then select a particular image, a selection of images, or simply any media item, such as an audio file, associated with or relevant to John for sharing.

Regardless of the order of selecting image and contact, i.e., whether it is block 401 and then 403, or block 403 and then 401, the next step in the process, in some embodiments, may be at block 405, where a triggering condition may be received by the control circuitry 220 and/or 228.

Figure 7:
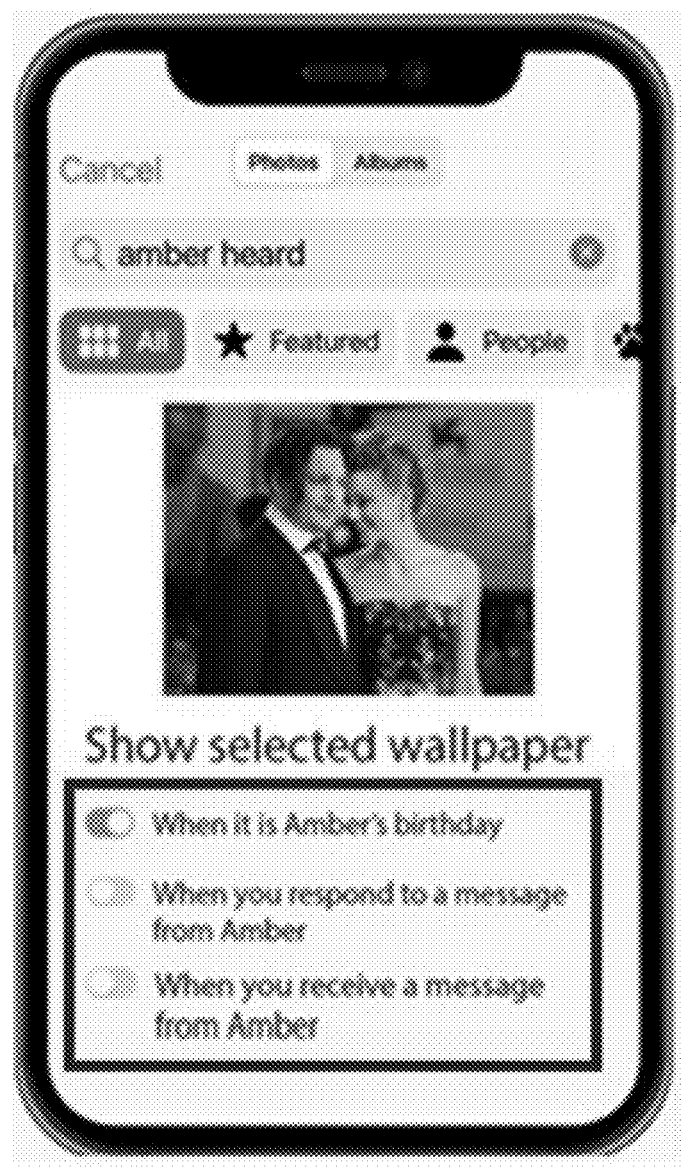
FIG. 7 is an example of selection of an image that includes the contact, in accordance with some embodiments of the disclosure.

The condition to trigger the sharing of the media item is what allows the control circuitry 220 and/or 228 to share the media item selected at block 401 with the contact selected at block 403. In some embodiments, the trigger may be a triggering condition, a trigger condition, and in others it can be a triggering event, or based on a triggering event. For example, the triggering event may be a contact's birthday, anniversary, or any special occasion. It may also be just a date that is important to the contact or a date or time of relevance. One example of selecting or creating such a trigger is depicted in FIG. 7 where the trigger to share the wallpaper with Amber Heard, the selected contact, is her birthday.

In another embodiment, the triggering condition to share the media item may be based on the shared location and proximity of the contact's device. In other words, the media item is to be shared only if the contact is within a predetermined distance of the user that is willing to share the media item. The predetermined distance may be determined by the user or control circuitry 220 and/or 228, or suggested by the AI algorithm. The predetermined distance may be shorter in an area with dense population or several buildings or attractions and longer in less dense areas. The proximity or predetermined distance may be determined based on whether a second electronic device is within a predetermined distance from a first electronic device or based on a location, such as Chicago, and determined whether the second electronic device is within a predetermined distance from the location. It may also be based on distance from a specific monument, address, or place.

In yet another embodiment, the triggering event to share the media item may be related to a sporting event, such as a sport team winning a game or whenever the team is playing. In this embodiment, the control circuitry 220 and/or 228 may monitor real-time scores of a favorite sporting event and use the scores as external triggers to share media items related to the sports team.

In some embodiments, triggers may also be based on a time interval (for example, daily), on a metric (for example, every five times the user unlocks their mobile device, or even on an external event (for example, an upcoming concert, sporting event, when favorite band or sports team plays, every time there is a score change in a game, etc.).

Several types of rules to trigger the sharing of the media item with the contact may be generated as desired. In some embodiments, the user of the electronic device may generate their own rules of when to trigger the process for sharing the media item with the contact. In another embodiment, the AI or ML algorithm may provide rule recommendations which when satisfied may trigger the sharing of the media item with the selected contact.

Figure 12:
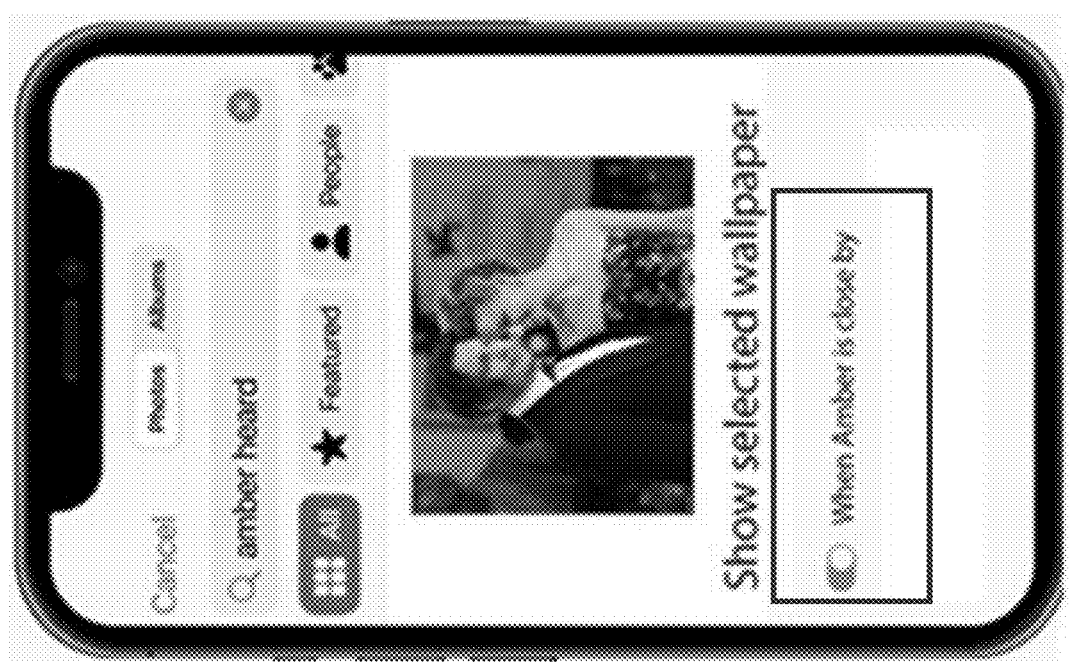
FIG. 12 is an example of a user interface that displays a proximity triggering condition, in accordance with some embodiments of the disclosure.

At block 407, a determination is made whether the trigger condition, or triggering event, is based on proximity of the contact, as depicted in FIG. 12. If it is not, then the process moves to block 413 and the media item is not transmitted to the contact. If it is based on trigger condition, or triggering event (the terms used interchangeably), then at block 408, the control circuitry 220 and/or 228 may determine if the contact agreed to share their location with the person/individual that wishes to share the media item. If the contact did not agree to share location, then the process moves to block 413 and the media item is not transmitted to the contact. If the contact agreed to share location, then the control circuitry 220 and/or 228 may use GPS, BLE or Wi-Fi positioning and other methods that are known in the art to obtain their location. In some embodiments, instead of the second user's device sharing GPS coordinates, due to privacy concerns, the second user's device may simply confirm that their location is within a certain range without providing the exact coordinates of the electronic device. Whether the device shares its coordinates, or simply acknowledges that it is within a proximity, the permission of such location- or presence-sharing is obtained by the control circuitry 220 and/or 228 prior to sharing the media item.

If a determination is made, at block 408, that the user who is on the receiving side of the shared item has not agreed to share their location and proximity ("No" at 408), then the control circuitry 220 and/or 228 may not transmit the media item to the contact, as depicted at block 413. Further details of the process to determine proximity and permissions to share the proximity are described in FIG. 11.

In addition to, or separate from, the proximity being a trigger, there may be other triggers that may need to be satisfied prior to sharing of the media item. As mentioned earlier, an example of such a trigger is an event, such as a birthday. As such, the control circuitry 220 and/or 228 may determine if another type of trigger condition exists. Whatever the trigger condition may be, and if there are multiple trigger conditions, including trigger conditions stacked on one another, At block 409, the control circuitry 220 and/or 228 may determine whether the trigger condition is satisfied.

Figure 8:
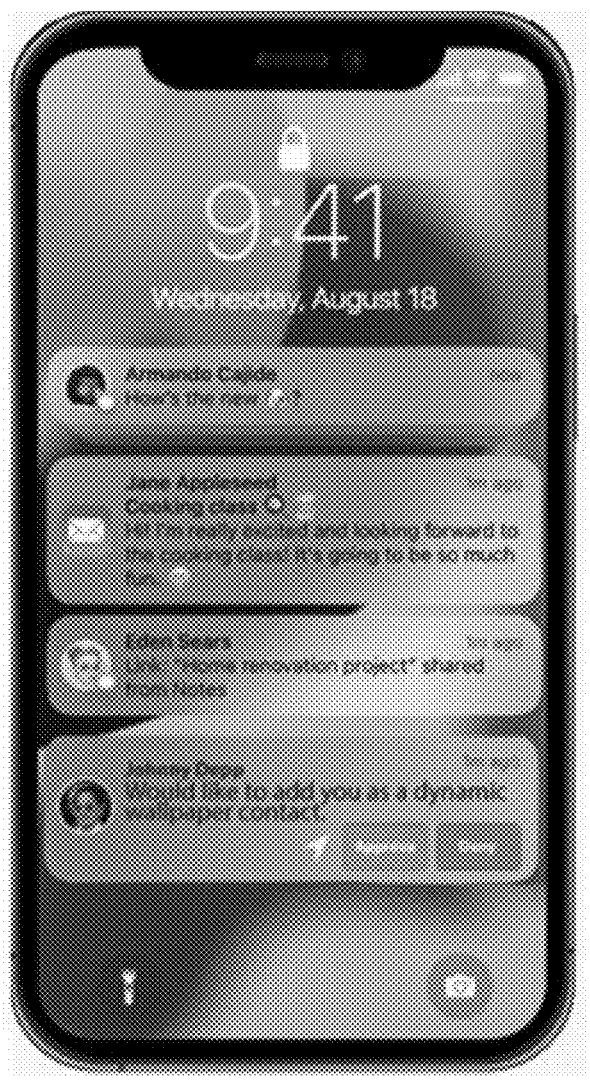
FIG. 8 is an example of an option presented to the contact for approving or denying sharing of the media item, in accordance with some embodiments of the disclosure.

If a determination is made, at block 409, that another triggering condition instead of or in addition to a trigger condition for proximity does exist and that it is satisfied, then the process moves to block 411, where the control circuitry 220 and/or 228 determines whether the contact is authorized to receive the media item. One example of such authorization is depicted in FIG. 8, where a pop-up on the contact's user interface of the electronic device, such as on Amber Heard's device, provides an option for the contact to approve or deny authorization to receive the media item.

If a determination is made at block 409 that another triggering condition exists and it is not satisfied, then the process moves to block 413, where the control circuitry 220 and/or 228 does not transmit the media item to the contact.

Referring back to block 409, once the trigger condition is satisfied, and the contact authorized receiving the media item at block 411, then at block 415, the control circuitry 220 and/or 228 determines whether the contact is in fact the actual person depicted in the media item, such as in the photograph or video. One method of verification is based on a hash calculation. As mentioned above, the sharing device emits one or more hashes it computes from the media item to the receiving electronic device. Upon receiving the one or more hashes, the receiving electronic device compares it with the lists of receivable hashes and responds with its own hash to trigger the user's device to send it the media items.

If a determination is made at block 415 that the contact is not the same person in the media item, then the process moves to block 413 where the control circuitry 220 and/or 228 does not transmit the media item to the contact.

If a determination is made at block 415 that the contact is the same person in the media item, then the process moves to block 417, where the control circuitry 220 and/or 228 transmits the media item to the contact. The control circuitry of the receiving device may automatically install the media item, such as a wallpaper, lock screen, alarm, or whatever the designation for it may be. In other embodiments, control circuitry 220 and/or 228 may seek permission from the contact on whose device the media item is to be installed prior to performing the installation.

Figure 9B:
FIG. 9B is an example of retaining the older wallpaper and not replacing it with the shared wallpaper if the contact disapproves the sharing of the wallpaper, in accordance with some embodiments of the disclosure.
Figure 9A:
FIG. 9A is an example of a media item installed as a wallpaper on the contact's electronic device, in accordance with some embodiments of the disclosure.

One example of a media item installed on the contact device is depicted in FIG. 9A. In this figure, the shared media item is a picture of Johnny Depp and Amber Heard, and it has been installed as a wallpaper on Amber Heard's (the contact) electronic device. If any of the triggers are not satisfied, such as in blocks 407, 409, 411, or 415, then as depicted in FIG. 9B, a current wallpaper is kept and not replaced with the shared wallpaper.

Figures 10A, 10B, 10C:
FIG. 10A is an example of a triggering condition used in connection with a sports team, in accordance with some embodiments of the disclosure.
FIG. 10B is an example of retaining older wallpaper when triggering conditions are not satisfied, in accordance with some embodiments of the disclosure.
FIG. 10C is an example of a shared wallpaper replacing the older wallpaper when triggering conditions are satisfied, in accordance with some embodiments of the disclosure.

FIGS. 10A-C depict similar installation but in a sports setting. In FIG. 10A, the control circuitry 220 and/or 228 receives triggering conditions set in relation to a sports team. For example, a triggering event to share a selected wallpaper is when the team wins or when the user is attending a game.

Other options that are not activated but shown on the screen include when the team scores or when the user is in close proximity to other users that also subscribe to the team. FIG. 10B depicts the current wallpaper, which is changed to the selected wallpaper in FIG. 10C if the triggering conditions as listed in FIG. 10A are satisfied.

Referring to block 419, the circuitry 220 and/or 228 may activate the electronic device's communication tools to allow all parties involved in sharing and receiving the shared media item can communicate with each other. In this embodiment, the circuitry 220 and/or 228 may utilize existing communication tools that are associated with the electronic device, such as phone, text, email, video chat, Snapchat™ or any other communication means that allows the recipient of the media item to communicate with the sender of the media item. For example, a first user willing to share a photograph in which a contact, also referred to as a second user, is depicted may select the second user as a contact at block 403. Based on the sharing triggers, authorizations, verifications, and installation processes discussed above, once the photograph is installed on the second user's electronic device, such as a wallpaper, the control circuitry 220 and/or 228 may automatically provide a selection option, such as via a pop-up screen, to allow the second user to communicate with the first user. Such communication may allow both users to discuss the memory related to the photograph.

In some embodiments, the circuitry 220 and/or 228 may activate the communication tools each time when the media item is activated, such as a wallpaper is displayed, or an audio file is played, on the electronic device. In other embodiments, the circuitry 220 and/or 228 may activate the communication tools only the first time the media item is activated. In yet other embodiments, the circuitry 220 and/or 228 may detect a prolonged gaze at the media item, such as a wallpaper or lock screen, and based on the gaze exceeding a predetermined time, may activate the communication tools such that the user can communicate with other users that are included in the media item. Since a user may have a prolonged gaze at the media item, such as a photo, because they are missing a person depicted in the media item, the control circuitry 220 and/or 228, by activating communication tools based on their prolonged gaze, allows the user to communicate with the other user at the time of missing the other user.

Figure 4B:
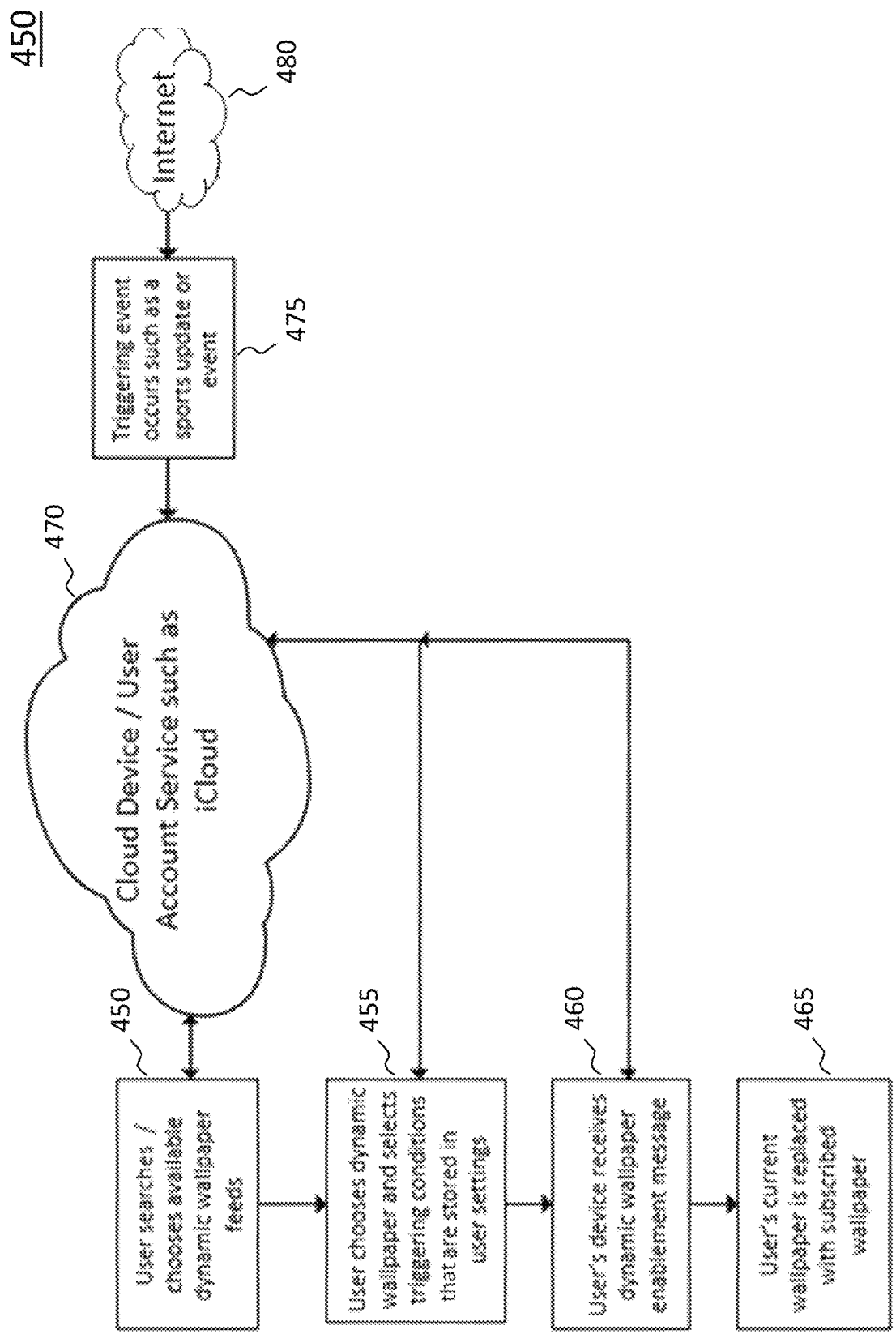
FIG. 4B is another flowchart of a process for sharing media with another electronic device based on an activation trigger, in accordance with some embodiments of the disclosure.

FIG. 4B is another flowchart of a process for sharing media with another electronic device based on an activation trigger, in accordance with some embodiments of the disclosure. Process 450 relates to a user subscribing to receive a media item, such as a wallpaper, based on triggers of certain events.

At block 450, a user may search and select available dynamic wallpapers. The selection of wallpapers may be offered to the user from a cloud device or user account service, such as iCloud™, as depicted at block 470.

Occurrence of a triggering event, such as a sports update at block 475, may be determined by the circuitry 220 and/or 228 from the internet (block 480). For example, a live score of an NBA™ game that is ongoing may be obtained from the internet in real time.

At block 455, once the user chooses the dynamic wallpaper and selects the triggering conditions from blocks 450 and 475, the user's device may receive a dynamic wallpaper enablement message. This message provides an option for the user to approve or reject enablement of the dynamic wallpaper provided by the cloud device or user account service from block 470. If the user agrees to the enablement, then at block 465 the user's current wallpaper is replaced with the subscribed wallpaper. The user may be presented with a variety of options to subscribe. For example, the user may subscribe to receiving a wallpaper every time the team plays, or only when the team plays at a particular venue. The user may also subscribe to receive the wallpaper when the team is in a certain round of the competition. The user may select a variety of rules to trigger the event for receiving a subscribed wallpaper. The user may also select the frequency at which they wish to receive the subscribed wallpaper, such as daily, every time the team plays, monthly, etc.

Figure 5:
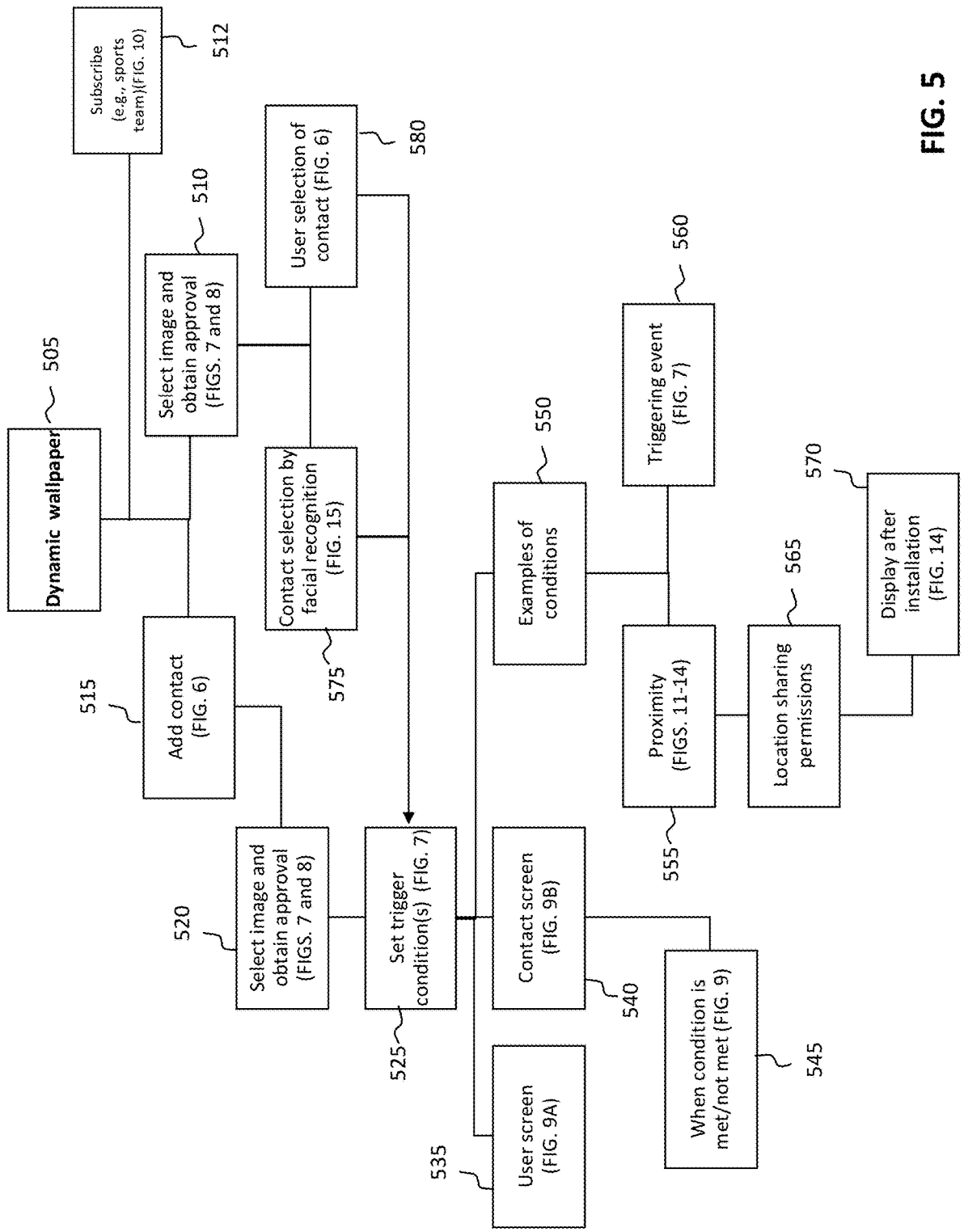
FIG. 5 is a block diagram of various user interfaces and functionality associated with sharing media with another electronic device, in accordance with some embodiments of the disclosure.

FIG. 5 is a block diagram of various user interfaces and functionality associated with sharing media item(s) with another electronic device, in accordance with some embodiments of the disclosure. In this embodiment, the process is used to describe the sharing of a media item that is to be installed as a wallpaper on the contact's electronic device. Although the media item used for this flowchart/process is a wallpaper (as depicted at block 505), the embodiments are not so limited and the flowchart/process may be applied to any other media item, such as a lock screen image, an alarm sound, a ringtone such as a specific ringtone associated with the specific individual that is sharing the media item, a pop-up screen with an image or information, or any a type of image, video, or audio file.

The user may begin the process of sharing via either block 510 or 515. At block 510, the user may select an image for sharing and then obtain approval from a contact to share the image. At block 515, a user may add a contact from their address book for sharing a media item first. The user may also select a subscription model from block 512.

In some embodiments, the process may be started by selecting a contact from the address book. One example of a user interface for selecting a contact is depicted in FIG. 6. As depicted in FIG. 6, the user has selected Amber Heard as a contact to share a dynamic wallpaper. Amber Heard's contact may be stored in an address book associated with the electronic device used by the user, and the user may enter the contact's name in the user interface to pull up the contact and select it to share the wallpaper. The user may also edit or create a contact and select to add a dynamic wallpaper.

Subsequent to selecting the contact, the user may select an image at block 520. One example of selecting an image is depicted in FIG. 7. In this example, the user that intends to share the wallpaper is Johnny Depp. As depicted, the user has selected a photograph of himself (Johnny Depp) and Amber Heard at an awards event to share with the contact, Amber Heard.

Once the selection is made, a notification is sent to the contact allowing the contact to approve or deny the sharing of the wallpaper. One example of an interface for accepting or denying a request to share the wallpaper is depicted in FIG. 8. In this figure, Amber Heard may receive a notification indicating that Johnny Depp would like to add her as a dynamic wallpaper contact, and the notification provides her the option to approve or deny the request.

As mentioned earlier, instead of at block 515, the process of sharing may start at block 510, where the user may select an image and then obtain approval from the contact. In this embodiment, upon selecting an image, the control circuitry 220 and/or 228 may display a list of contacts that are depicted in the selected image. If the image selected is the picture of Johnny Depp and Amber Heard in FIG. 7, then the control circuitry 220 and/or 228 may suggest to the user, who is Johnny Depp, to add Amber Heard as a contact for sharing the picture as a wallpaper. In some embodiments, at block 575, the contact selection may be based on facial recognition as depicted in FIG. 15. Here the facial recognition algorithm along with the control circuitry 220 and/or 228 may automatically select the contact that is depicted in the image for sharing the image. In another embodiment, at block 580, as depicted in FIG. 6, the user may be provided a list of contacts and the user may select the contact from the list that the user wishes to share that image with.

Regardless of the order of selecting image and contact, i.e., whether it is blocks 515 and then 520 or blocks 510, 575 or 580, the next step in the process, in some embodiments, may be at block 525 where a triggering condition is selected by the user. One example of a trigger condition is depicted in FIG. 7. The trigger condition for sharing the selected image may be suggested to the user by the control circuitry 220 and/or 228 or created by the user.

One example of a media item installed on the contact device is depicted in FIG. 9A. Blocks 535 and 540 depict various user interfaces of where the wallpaper is installed and where it is not installed. In this figure, the shared media item is a picture of Johnny Depp and Amber Heard, and it has been installed as a wallpaper on Amber Heard's (the contact) electronic device. At block 545, if any of the triggers are not satisfied, then FIG. 9B depicts a current wallpaper on Amber Heard's device that is kept and not replaced with the shared wallpaper.

In some embodiments, block 550 includes some examples of trigger conditions. In some embodiments, the trigger is an event such as the contact's birthday or a shared event from a calendar, as depicted in FIG. 7. In another embodiment, the trigger is based on the device being within a certain proximity (as reported based on location services (such as GPS coordinate-sharing or location-sharing), as depicted in FIGS. 11-14.

Figure 11:
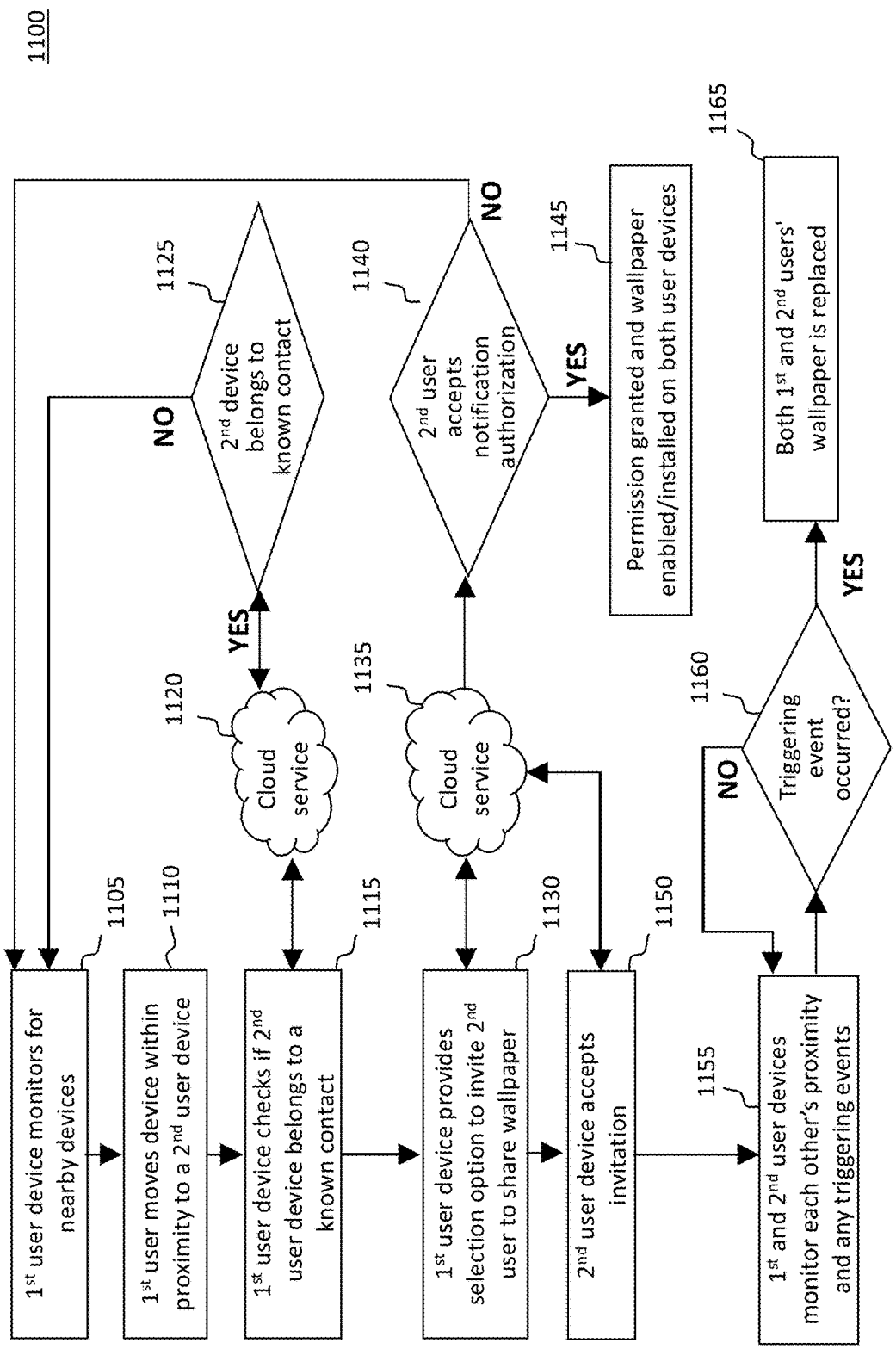
FIG. 11 is a flowchart of a process for sharing a media item based on a triggering condition that first and second users are within a predetermined proximity of each other, in accordance with some embodiments of the disclosure.

In some embodiments, FIG. 11 describes a process for sharing a media item when the triggering condition is the presence of a second user device within a threshold proximity or distance of the first user device. In some embodiments, at block 1105, the control circuitry 220 and/or 228 of a first user device monitor for nearby devices. The control circuitry 228 may routinely monitor for nearby devices at periodic intervals or may monitor for nearby devices once it detects a selection of a threshold condition by the first user to share a media item when a second user device is within the threshold proximity.

At block 1110, the control circuitry 228 determines that the first user moves their device within a proximity to a second user device. To determine that the first user device and the second user device are within a proximity, the control circuitry 220 and/or 228 may use GPS coordinates obtained by both devices to calculate the distance between the two devices.

At block 1115, the control circuitry 228 of the first user device checks to determine if the second user device belongs to a known contact of the first user device. The control circuitry 228 may make the determination based on searching the first user's address book that is stored in the first user's electronic device. The control circuitry 228 may also make that determination based on obtaining data from a third-party cloud service or a user account service, such as iCloud™.

If a determination is made at block 1125 by the control circuitry that the second device belongs to a known contact, then the process moves from block 1115 to block 1130. If a determination is made at block 1125 that the second device does not belong to a known contact, then the first user device continues to monitor for nearby devices until it finds a device that is a known contact.

At block 1130, in some embodiments, the control circuitry 220 and/or 228 provides the selection option on the user interface of the first user device to invite the second user to share the wallpaper, and the first user selects the option. The control circuitry 220 and/or 228 may interact with the second user using a third-party cloud service or a user account service, such as iCloud™.

At block 1140, the notification may appear on the user interface of the second user's device. The notification may provide an option for the second user to authorize the sharing of the wallpaper and sharing of their location. If, at block 40, the second user authorizes the sharing, then at block 1145 the control circuitry 228 of the first device receiving the permission granted may enable or install the wallpaper on both the first user's and the second user's devices.

At block 1140, if the second user device does not accept the notification authorization, then the process returns to block 1105, where the first user device continues to monitor for nearby devices that may authorize sharing of the media item.

At block 1150, the second user device accepts the invitation. At block 1155, the first and second user devices monitor each other's proximity and any other triggering events. For example, there may be multiple triggering events satisfaction of which would then result in sharing the wallpaper. A first triggering event for the wallpaper being shared with a second user device may be the second user device moving within a predetermined proximity of the first user device. In some embodiments, proximity of the second device may be the only triggering condition. In other embodiments, in addition to the proximity of the second device being within a threshold distance, the first user may have added additional triggering events or additional conditions, such as the second user's birthday, or the second user being within a proximity of distance and it being a weekend, or that the proximity of distance should be determined only when both users are at a sporting event, or any other additional triggering event or condition.

At block 1160, the control circuitry 220 and/or 228 may determine if the triggering event has occurred. If a determination is made at block 1160 that the triggering event has occurred, in other words the condition of the triggering event has been satisfied, then at block 1165, the control circuitry 220 and/or 228 may replace both the first and second users' wallpaper with the shared wallpaper. However, if a determination is made at block 1160 that the triggering event has not occurred or the triggering condition has not been satisfied, then the process moves back to block 1155 where the first and second user devices monitor each other's proximity and any other triggering events until such proximity or triggering events have been satisfied.

Figure 13:
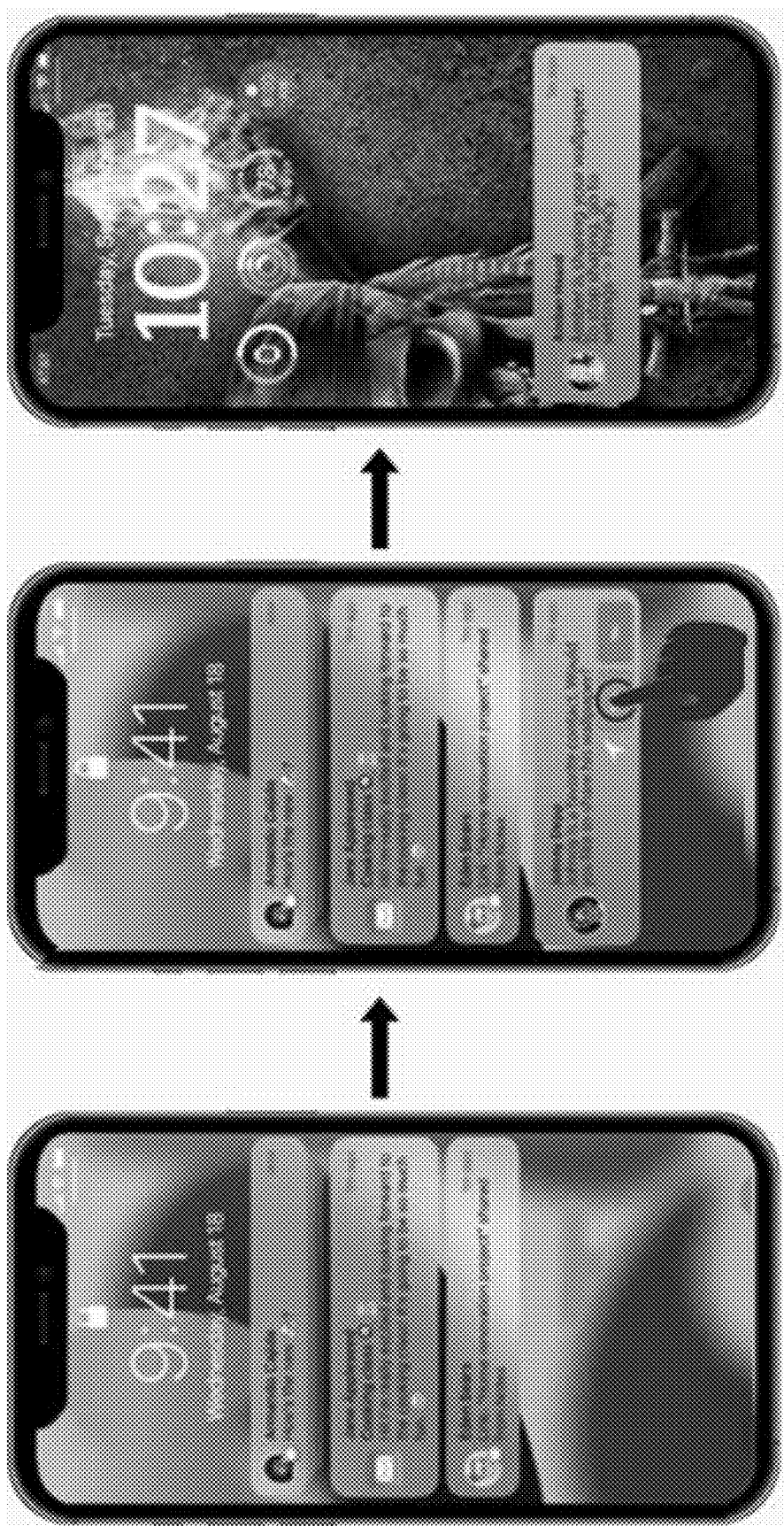
FIG. 13 depicts a user interface that displays options to approve or deny an invitation to share and related notifications, in accordance with some embodiments of the disclosure.
Figure 14:
FIG. 14 depicts an example of a user interface that displays a wallpaper replaced by the shared photo, in accordance with some embodiments of the disclosure.

Referring back to FIG. 5, one example of selecting a triggering condition that requires proximity of both devices to be within a predetermined distance (block 555 in FIG. 5) is depicted in FIG. 12. The notification that the first user desires to share their wallpaper with the second user is depicted on the second user's user interface as depicted in FIGS. 13 and 14. If the second user accepts the sharing request, then the wallpapers on the second user's device and the first user's device are replaced by the shared wallpaper, also as depicted in FIG. 13 and blocks 565 and 570.

In another embodiment, at block 512, the first user may select an option to subscribe to a service, a sports team, a workplace, or any other institution for receiving wallpapers. The first user may subscribe to a dynamic wallpaper feed that may automatically (if allowed or enabled by the user)

changes the wallpaper graphic or configuration on their device. This change to the user's wallpaper may be triggered on a timed basis (for example, daily), on a metric (for example, every five times the user unlocks their mobile device) or on an external event (for example, whenever their favorite college football team has a game).

The process of subscribing to and receiving wallpapers may include the first user selecting and adding a favorite sports team (or any other entity) and subscribing to it. The user may also indicate what types of wallpapers to include in the subscription or the sports team, or the service may determine which wallpapers to send without any input from the user. The sports team or service may also have tiers of subscriptions, and each tier may provide different benefits and types of wallpapers. For example, in some subscription levels, the sports team or service may provide a ticket to their event as a wallpaper or a screen lock that can be scanned at the event for admission to the event. The wallpaper may also include a real-time sports score as well as a graphical background. This feature may also include image sourced from the internet (for example, a favorite sports team logo, meme or other image), which may be triggered based on events such as a favorite sports team winning a game, a fantasy sports team win or a winning bet placed on a particular game). One example of selecting a sports team and indicating the trigger preferences is depicted in FIG. 10A. An example of a screen of the electronic device prior to the sharing of the wallpaper is depicted in FIG. 10B, and an example a screen of the electronic device after the wallpaper has been enabled/installed is depicted in FIG. 10C.

In some embodiments, the process of subscribing may include receiving a request from a requesting electronic device to subscribe to receiving one or more media assets. In addition to the request, a condition for fulfilling the subscription may also be received or determined. The condition may relate to the requesting electronic device being within a predetermined proximity to a location of an event related to the subscription, such as if the subscription is to an NBA team, the location and event may be a place where the team is currently (or will be) playing their game, such as Chase Center in San Francisco for the Golden State Warriors. The system may, in response to the condition being satisfied, automatically cause the requesting electronic device to provide an output of the subscribed one or more media assets. This may include, for example, automatically modifying a wallpaper on the requesting electronic device with a wallpaper of the teams playing today, update of a score, profile of a player, some key highlights of the game etc.

FIG. 15 is a block diagram of a multi-user environment in which the media item is shared, in accordance with some embodiments of the disclosure. In this embodiment, the control circuitry 220 and/or 228 may receive a selection of an exemplary media item (such as a photograph) on a first user device. The control circuitry 220 and/or 228, using facial recognition techniques, may determine that the photograph includes two individuals, Michelle and Andy. The control circuitry 220 and/or 228 may further determine that both Michelle and Andy are contacts of the first user. Based on the determination, the control circuitry 220 and/or 228 may send an invitation to both Michelle's and Andy's mobile phones seeking their approval of the first user sharing a photograph as a wallpaper on their mobile phones. In this embodiment, Michelle may authorize the wallpaper to be shared with her, and Andy may not authorize the sharing of the wallpaper. The control circuitry 220 and/or 228, receiving the sharing preferences from Michelle and Andy, may then transmit the photograph only to Michelle and change her wallpaper, since she has authorized sharing and enabling of such wallpaper.

The process of sharing a media item such as a photo with multiple people, based on their presence in the photo, as described above in FIG. 15 may also be accomplished in another embodiment where plurality of mobile devices may be set to group photo mode. In this embodiment, each device may provide a distance filter within a settings application, specifying the range where the user would like to send or receive group photos, for example, within a 10-mile radius of the user's current location. Various techniques may be used to make connections with other electronic devices within the range specified. For example, each device may establish a peer-to-peer connection with the other device once both devices approve the connection. Other types of connection techniques, such as using cellular networks to obtain a GPS location of another device and then determining whether the GPS location is within the defined range may also be used. Other types of existing technologies that allow detection of devices, communication between devices may also be used.

Figure 17:
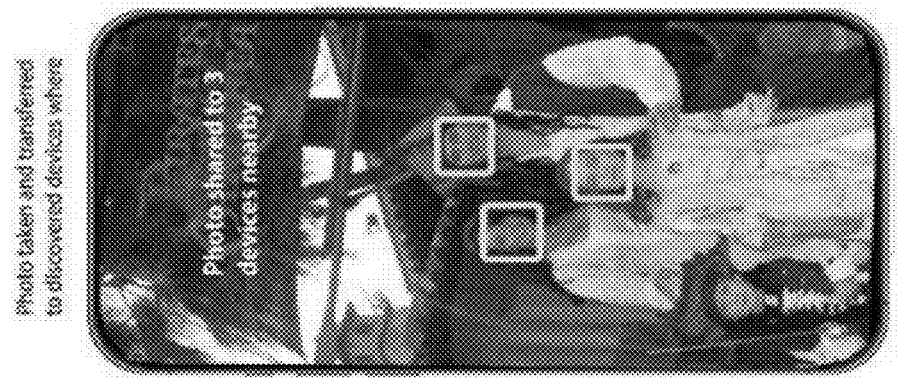
FIG. 17 depicts an example of a user interface for facially recognizing individuals in a group photo and sharing the photo with them, in accordance with some embodiments of the disclosure.
Figure 17:
Figure 17:

When in this mode, each device advertises that it is available to receive photos. When a photo is taken by a first device, that device scans (using Bluetooth, Wi-Fi or other scanning technique) for nearby devices that are advertising themselves as being in group photo mode. For each device discovered, a proximity value based on geo-location or RSSI value is calculated. For each device discovered where the proximity value is less than or equal to the first device's distance filter, an ad-hoc connection between the first device and the discovered device is created, and the photo is transferred to the discovered device. In this way, it is possible to share photos with anyone within a given range of the first device. It may be desirable to employ a combination of facial recognition and an identifier to filter out unwanted recipients. For example, when entering group photo mode on the device, a user may be asked to identify themselves using facial identification (such as but not limited to Apple's Face ID™). When a first user takes a photo and the photo is shared to each discovered device as described above, the first device may calculate a facial hash, which may be the result of a facial recognition algorithm for each face recognized in the photo. During the file transfer process, the first device may ask each device for a facial hash that is calculated on the receiving device and time-limited using the same facial recognition algorithm as the first device. The first device checks each device's facial hash to see if it matches any face recognized within the photo. If there is a match, the file transfer may proceed. One example of using the group photo mode described above is depicted in FIG. 17. As depicted in FIG. 17, a user may enter group photo mode, the mode may perform an analysis of everyone in the group photo depicted and identify all the individuals in the photo, the photo may then be shared with devices of people who have been identified as contact and are depicted in the group photo.

Figure 16:
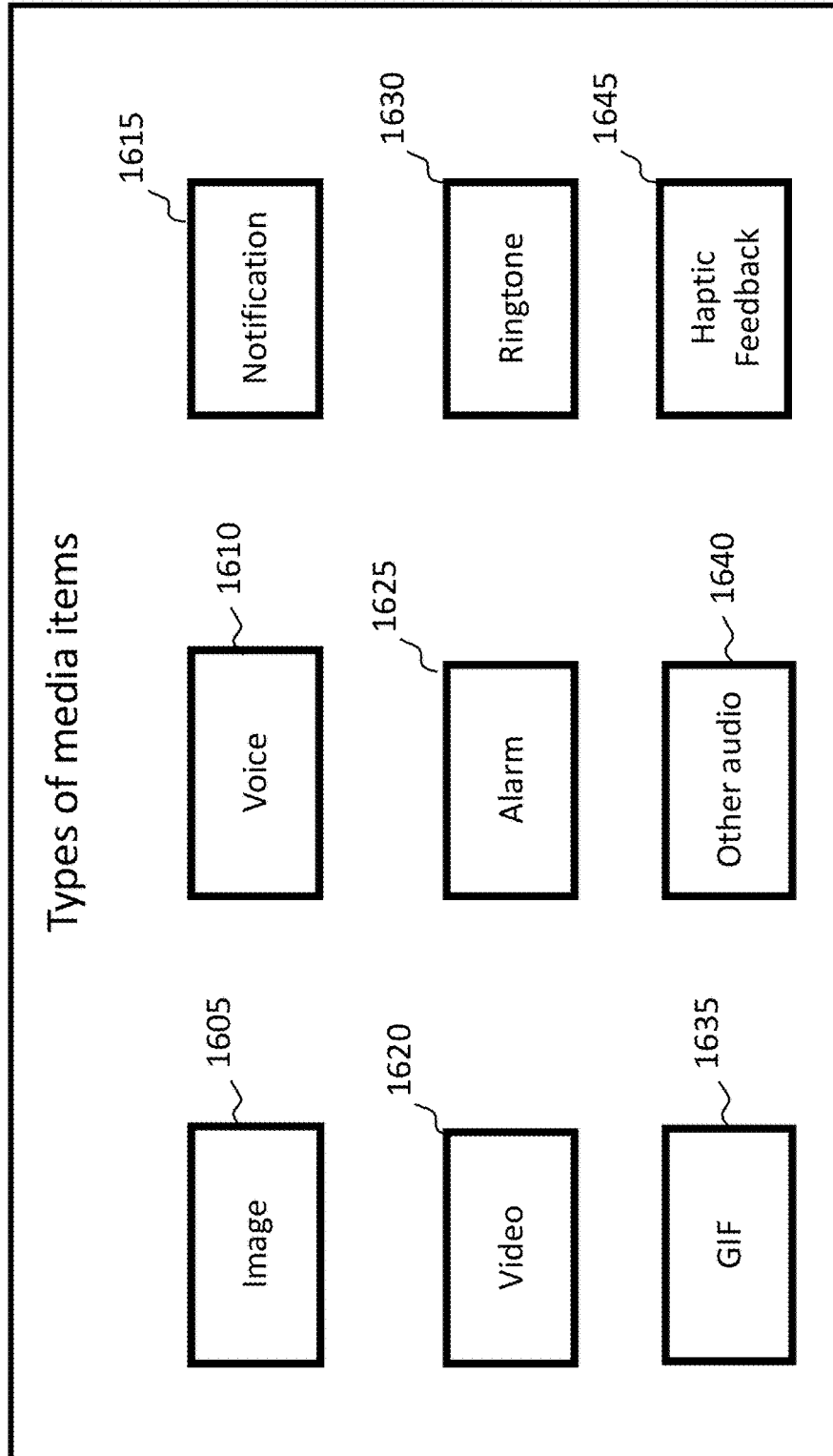
FIG. 16 is a block diagram of examples of types of media items that can be shared, in accordance with some embodiments of the disclosure.

FIG. 16 is a block diagram of examples of types of media items that may be shared, in accordance with some embodiments of the disclosure. In some embodiments, the media item shared may be an image. For example, it may be an image of a logo, a sports team, a celebrity, a monument or historic place, a tourist attraction, a company, an educational institution, or any other entity. It may be a photograph taken by the using the camera of the electronic device or it may be an image stored in the photo library of the electronic device.

In some embodiments, as depicted at 1610, the media item that may be shared may be a voice file. For example, it may be a voice recording of the user recording a certain message. In another embodiment, it may be a voice recording of a celebrity or an influencer. In another embodiment, it may be a character voice from a movie, cartoon, sitcom or an animated motion picture. In yet another embodiment, it may be a voice file of a digitally created voice message.

In some embodiments, as depicted at 1615, the media item that may be shared may be a notification. For example, it may be a notification for the user to approve or deny something, a notification to inform the user of open upcoming event, or a notification of any other kind. The notification may be in a text format and may be displayed as a pop-up, highlighted, or overlayed on other text or images displayed on the user interface.

In some embodiments, as depicted at 1620, the media item that may be shared may be a video. For example, it may be a video, a GIF (as also depicted at 1635), or a type of animation.

In some embodiments, as depicted at 1625, the media item that may be shared may be an alarm sound. For example, it may be a specific type of music or tone for a mobile alarm.

In some embodiments, as depicted at 1630, the media item that may be shared may be a ringtone. For example, it may be a certain sound, like the chirping of birds, music, digitally created sound, natural sounds, songs, or a voice recorded note that can be used as a ringtone. It may also be any other type of audio, as depicted at block 1640.

In some embodiments, as depicted at 1645, the media item that may be shared may be haptic feedback. For example, it may be a certain type of vibration, tone, sound, or a combination of such that may be implemented on the electronic device such that the haptic feedback is activated when the another media item from the same user is shared, when the first electronic device that shared the media item is calling the second electronic device, or may be activated at any other desired event or at all times when the second electronic device determines to use a haptic feedback.

Figure 18:
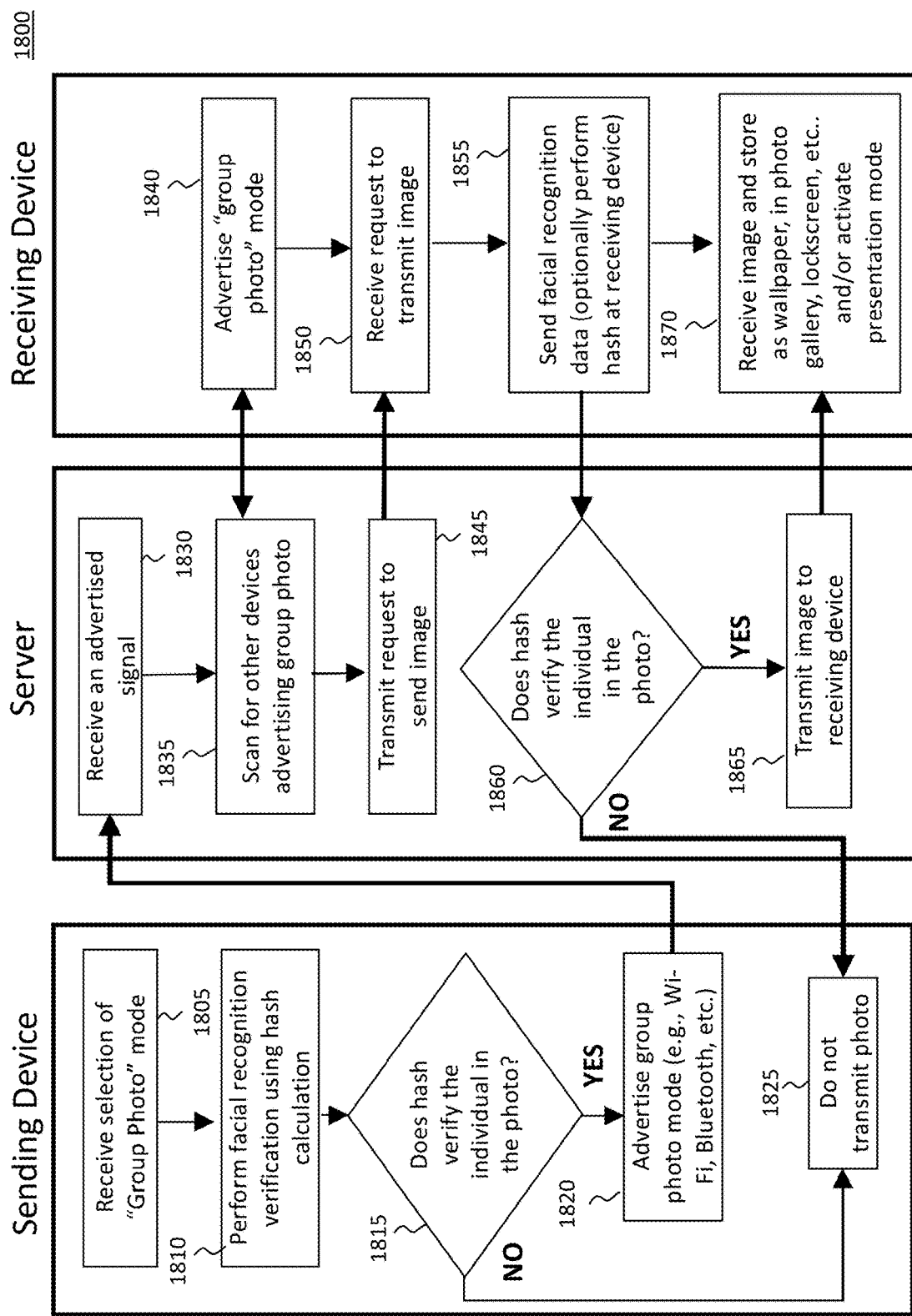
FIG. 18 is a flowchart of a process for sharing a dynamic wallpaper based on two electronic devices moving into predetermined proximity of each other, in accordance with some embodiments of the disclosure.

FIG. 18 is a flowchart of a process for sharing a dynamic wallpaper based on two electronic devices moving into predetermined proximity of each other, in accordance with some embodiments of the disclosure. In some embodiments, at block 1805, a sending device may receive a selection of a group photo mode. This may be based on a user activating group photo on their device. At block 1810, the sending device may perform a facial recognition verification using a hash calculation as described above. At block 1815, the control circuitry 220 and/or 228 determines whether the hash calculated verifies the individual in the photo, if it does, then at block 1820, the sending device may advertise group photo mode such that other devices in proximity may detect that the sending device has group photo mode activated.

The server at block 1830 may receive the advertised signal and at block 1835 scan for other devices that also advertise group photo. Based on the scan, at block 1840, the server may detect that the receiving device also have group phot mode activated.

At block 1850, the receiving device may request the server to transmit the image. The server, at block 1845 may transmit the image to the receiving device and the receiving device may compute its own hash and transmit and transmit to the server at block 1855.

The server may receive the hash from the receiving device, determine whether the hash verifies the individual in the photo, at block 1860, and if it does, then at block 1865 transmit the image to the receiving device.

At block 1870, the receiving device may receive the image and use it as a wallpaper, lockscreen etc.

Figure 19:
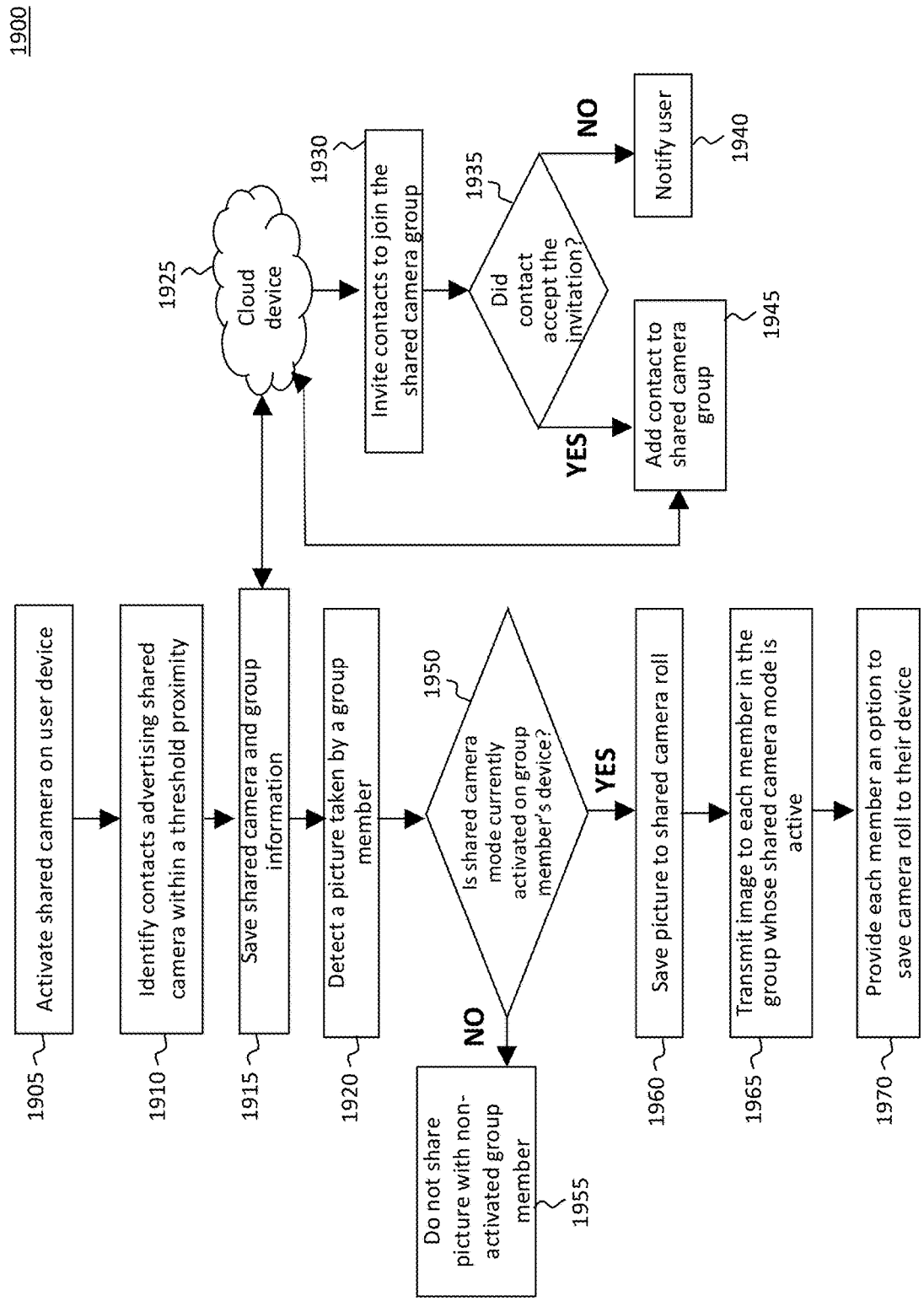
FIG. 19 is a flowchart of a process for a shared camera to auto-send a picture or another media item to members of a shared camera group, in accordance with some embodiments of the disclosure.

FIG. 19 is a flowchart of a process for a shared camera to auto-send a picture to members of a shared camera group, in accordance with some embodiments of the disclosure. In some embodiments, the shared camera is a mode that can be configured on an electronic device. It can be activated by the users of a selected group or automatically activated by the control circuitry 220 and/or 228. When activated, if any one member of the group takes a picture, it is as if all members that are signed on to the shared camera have also taken the picture and provides them full sharing, editing, storing, and presentation functionality and rights over the picture.

The method for creating a shared camera among a group of contacts involves a member of the group using their device camera to enable the shared camera function. Once enabled, images taken are added to a shared camera roll and set as wallpaper background for the members of the group where they can choose to save them directly to their individual camera roll.

In this embodiment, a first user browsing a camera roll or photos folder that was created using a shared camera or a folder of photos that has previously been shared with other users may initiate a shared viewing, where members of the group may interactively choose images that are then displayed on the participating members' devices.

In some embodiments, using the shared camera mode, the first user of a shared group may invite other members of the group to a joint viewing session where other group members can select images from the shared folder that are displayed on all participating member's devices.

In another embodiment, a first user may create a shared camera, which automatically adds images taken when the shared camera mode is active to the camera roll (located in local, cloud or other photo storage) when any member of the group enables the shared camera and takes a picture with their device. When creating or editing the members of the shared camera group, users may be added from a contact list or may be suggested based on detected proximity.

The above-mentioned embodiments, and other embodiments described in FIG. 19, may be enabled by the process 1900. In some embodiments, the process is described based on actions performed by the sending device (or the device of the first user), the server, and the receiving device (device of a group member). Although the process is described based on actions of these separate devices, the embodiments are not so limited and any one of the devices, or combination of the devices, can perform the same process.

In some embodiments, at block 1905, the control circuitry 220 and/or 228 receives a notification that a shared camera mode has been activated on a user device. At block 1910, based on the notification received, the control circuitry 220 and/or 228 may search and identify contacts within a threshold proximity that have activated shared camera. In some embodiments, the control circuitry 220 and/or 228 may receive a signal from other devices that are contacts of the user, or any device regardless of whether they are a contact of the user, which advertise shared camera mode. Based on the received advertised signals, the control circuitry 220 and/or 228 may determine which devices are contacts of the user (such as by comparing them to the user's address book) and whether the signal, which includes a location, is within a predetermined proximity of the user's device.

At block 1915, the control circuitry 220 and/or 228 may save the shared camera and group information on a cloud application, such as application 1925. Such shared camera and group information may include details in terms of which devices associated with contacts have joined a group in which the user is included, and which have not. For those devices that are the contacts of the user but have not joined a group in which the user is included, at block 1930, the control circuitry 220 and/or 228 may send an invitation to each contact to join the group. At block 1935, the control circuitry 220 and/or 228 may determine whether the contact has accepted their invitation to join the group. If a determination is made that the contact has accepted the invitation to join the group, then the contact, at block 1945, is added to the shared camera group. If a determination is made at block 1935 that the contact has not accepted the invitation, then at block 1940 the first user is notified.

Referring back to block 1915, after the shared camera and group information has been stored, such as in the cloud, at the device level, or at a server, the control circuitry 220 and/or 228 detects that a picture has been taken by a group member at block 1920.

At block 1950, the control circuitry 220 and/or 228 determines whether the shared camera mode is currently activated on a group member's device. In response to determining that the shared camera mode is not currently activated, at block 1955, the control circuitry 220 and/or 228 does not share the picture with the group member whose device is not activated.

If a determination is made that the shared camera mode is currently activated on a group member's device ("Yes" at block 1950), then the control circuitry 220 and/or 228 saves the picture to the shared camera roll at block 1960. At block 1965, the control circuitry 220 and/or 228 transmits the image to each user in the group whose shared camera mode is currently active. At block 1970, the control circuitry 220 and/or 228 provide each member of the group to whom the image is transmitted an option to save the camera roll to their device. Having saved the camera roll to their own device allows the member full rights to the picture, including to edit the picture or use it in a presentation. In some instances, the edits made by one of the members on their camera roll, such as an edit made to a picture, may be synchronized with a central storage, or cloud storage, that stores the original and all version of the picture. In such instances, a rule may be implemented that all or a threshold number of members with whom the picture is shared must agree to synchronization of any edits. It may also require the member of a group to agree to the synchronization.

Figures 20A, 20B, 20C:
FIG. 20A depicts an example of a user interface for enabling sharing of a new photo taken with members of a group when the group has joined the shared camera group, in accordance with some embodiments of the disclosure.
FIG. 20B depicts an example of a user interface where one member of the shared camera group takes a photo, in accordance with some embodiments of the disclosure.
FIG. 20C depicts an example of a user interface where a photo is taken by one member of the shared camera group is enabled as a wallpaper on electronic device of another member of the group, in accordance with some embodiments of the disclosure.

FIGS. 20A-C are examples of user interfaces for shared camera mode and sharing of pictures in the shared camera mode, in accordance with some embodiments of the disclosure. In some embodiments, FIGS. 20A-C are user interface examples of the process described in FIG. 19 for a shared camera to auto-send a picture to members of a group shared camera group. In some embodiments, FIG. 20A depicts a shared camera group called "Pirate's camera." The user interface allows the user to select members of the group to share the group photo. FIG. 20B depicts a photo taken by a member of the shared camera group, and FIG. 20C depicts a wallpaper on a group member's device when the group member's device has its shared camera mode active on the device.

The examples of 20A-C may be performed, in some embodiments, where shared camera group, also referred to as shared content more is activated by a first electronic device.

Once the control circuitry 220 and/or 228 detects that shared content mode is activated by the first electronic device, the control circuitry 220 and/or 228 may identify a second electronic device that has activated the shared content mode. The control circuitry 220 and/or 228 may continue and identify all devices within a predetermined location (or within proximity of the first electronic device) that have also activated the shared content mode.

The control circuitry 220 and/or 228 may automatically generate, based on a selection factor, a shared content group that includes the first and second electronic devices. If several devices are determined to have activated the shared content mode, then all those devices will be automatically placed in the shared content group.

The selection factor indicates that a profile associated with the second electronic device is associated with a contact of the first electronic device. The selection factor may also indicate that a first social media profile associated with the first electronic device is connected with a second social media profile associated with the second electronic device.

The selection factor may also indicate that users associated with the first and second electronic devices share a contextual relationship. For example, the shared contextual relationship relates to the users associated with first and second electronic devices participating in a same event, group, or electronic communication, such as going to a same basketball game or same Broadway play or being part of a same WhatsApp group (even though they may not be contacts of each other).

In some embodiments, the control circuitry 220 and/or 228 may determine that the shared contextual relationship relates to the users associated with first and second electronic devices participating in a date-specific event and in response to the determination, causing display of the shared media asset automatically on a display of the second electronic device The control circuitry 220 and/or 228 may receive an indication that the first electronic device has shared a media asset with the shared content group and in response to receiving the indication, provide the second electronic device with access to the media asset.

In some embodiments, the control circuitry 220 and/or 228 may perform facial recognition to determine that the shared media asset includes a depiction of a user associated with the second electronic device. The control circuitry 220 and/or 228 may, in response to determining that the shared media asset includes the depiction of the user associated with the second electronic device, cause display of the shared media asset automatically on a display of the second electronic device. The process of performing facial recognition may include the control circuitry 220 and/or 228 capturing, by the first electronic device, a profile picture of the user associated with the second electronic device. The control circuitry 220 and/or 228 may then send the profile picture to the second electronic device for confirmation and receive a confirmation from the second electronic device verifying that the profile picture is associated with the user of the second electronic device. Such verification and confirmation ensure that the media item is shared with the right person, i.e., if it's a photograph being shared, then it ensures that the person being shared with is in fact the person in the photograph. Other facial recognition methods and calculations, such as using hash calculations to verify the identity of an individual may also be used.

Figure 21:
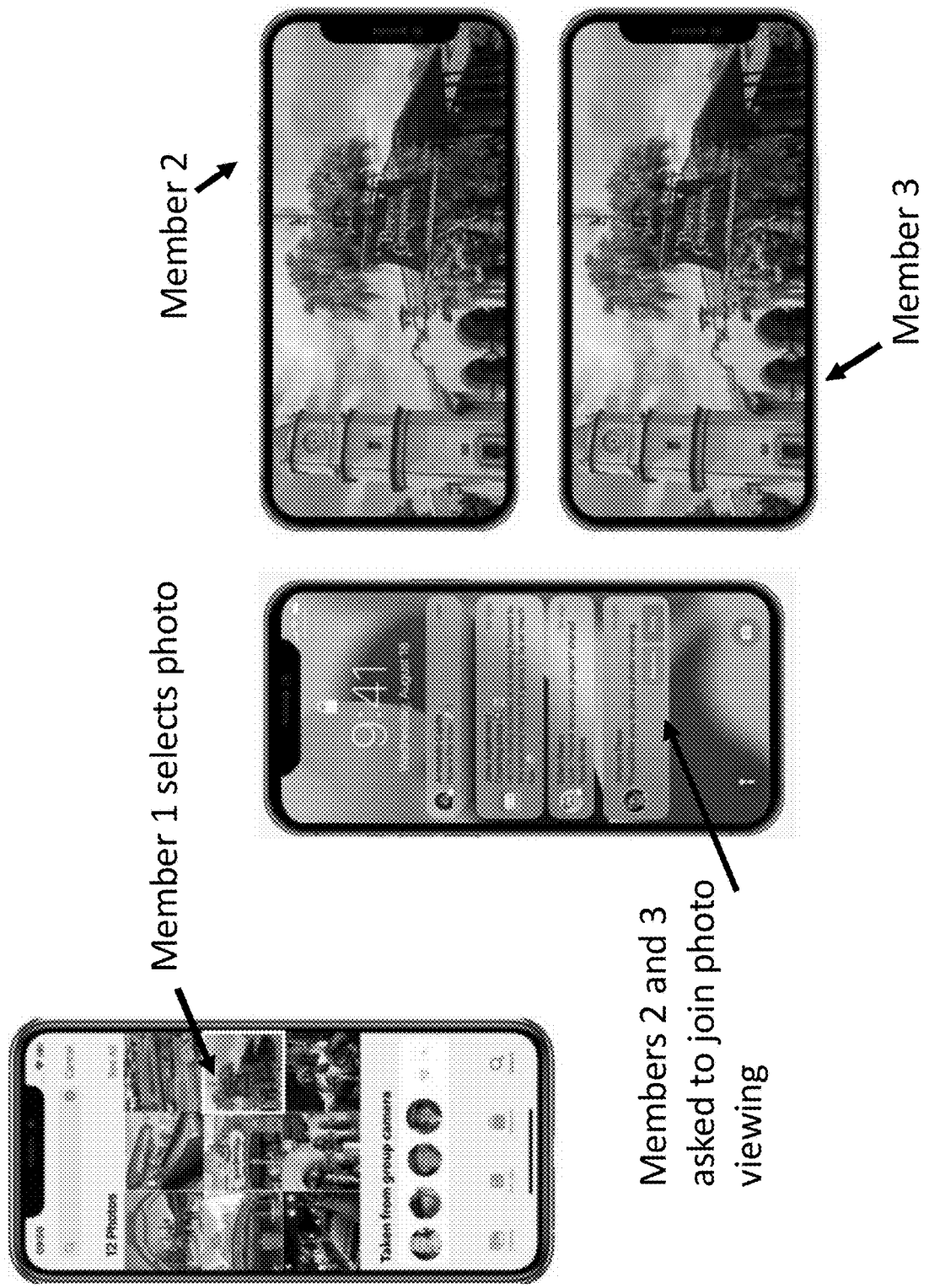
FIG. 21 is an example of multiple members of a group viewing a photo at the same time when in active shared camera mode or viewing mode, in accordance with some embodiments of the disclosure.

FIG. 21 is an example of multiple members of a group viewing a photo at the same time when in active shared camera mode, in accordance with some embodiments of the disclosure. The user interfaces shown in FIG. 21 utilize the process described in FIG. 19 for a shared camera. Once a photograph is shared with other members of the group at 1965 in FIG. 19, in some embodiments, a member of the group, such as member 1 in FIG. 21, desiring to view the selected photograph in a joint viewing session, may invite other members of the group to join a photo viewing session. The other members of the group may have the option to approve or deny the invitation. In some embodiments, as depicted in FIG. 21, if both members 2 and 3 of the group accept to join the photo viewing session, then any photo viewed by member 1 will also be simultaneously and in real time be viewed by members 2 and 3. Having such multiuser viewing session in real time may allow multiple users to share a memory together at the same time and allow them to talk to each other using communication tools during the viewing session, thereby enhancing their photo-sharing and viewing experience.

Figure 22:
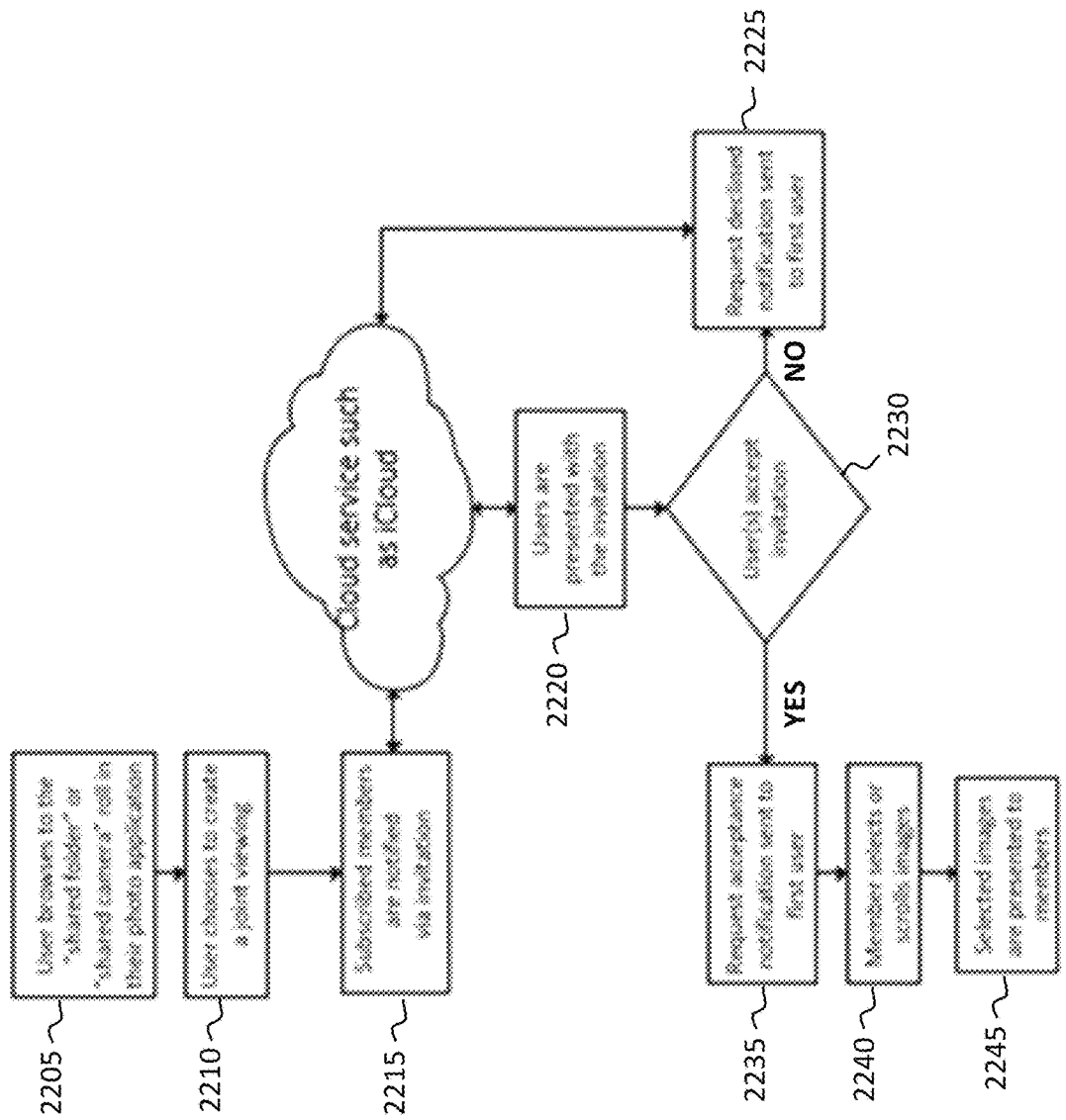
FIG. 22 is a flowchart of a process for allowing multiple members of a group to view a photo at the same time when in active shared camera mode, in accordance with some embodiments of the disclosure.

FIG. 22 is a flowchart for allowing multiple members of a group to view a photo at the same time when in active shared camera mode, in accordance with some embodiments of the disclosure. The flowchart of FIG. 22 is used for features, functionality, and user interfaces described in FIG. 21.

In some embodiments, at block 2205, the user browses to the shared folder or shared camera roll in their photo application. Once the user browses to such a folder or shared camera roll, then at block 2210 the user, in some embodiments, chooses to create a joint viewing session. As described earlier, a joint viewing session is a session in which multiple members/users of a group can simultaneously and in real time view a same photograph together.

At block 2215, members that have subscribed to the joint viewing session may be notified that they are joined. They may also be notified that the joint viewing session is about to begin. They may also be notified of a scheduled time when the joint viewing session will begin. In another embodiment, members of the group that are not subscribed to the joint viewing session may be invited to join the session. The communications between members and the sending and accepting of the invitation may be made through the internet, via texts or email, or via cloud service, such that users are presented with the invitation at block 2220. If the users do not accept the invitation at block 2230, then at block 2225 the users that have rejected the invitation are not presented with a joint viewing and a notification to the first user is sent. If a determination is made at block 2230 that the user has accepted the invitation, then at block 2235 the requested acceptance notification is also sent to the user.

At block 2240 the member selects or scrolls through images in their photo library, such as a photo library that was part of a joint viewing session. At 2245 as the user selects images, and the same images are presented to the members that have accepted the joint viewing invitation such that the images can be viewed simultaneously by all the members that have accepted the joint viewing invitation. In some embodiments, the system may also present all the users involved in the joint viewing session with communication tools such that they can interact and talk to each other while the photos are being presented, to enhance their photo viewing experience.

In some embodiments, the methods, processes, and user interfaces relating to shared camera mode described in FIGS. 19-21 may also be used in a social media setting. In an embodiment, a user who follows another user on social media, such as Facebook or Twitter, may create a camera roll or shared folder based on the followed user, associated tag, or context. For example, a first user follows Johnny Depp on the Twitter application. The first user, on their mobile device (after linking access to the Twitter application), may, via a user setting, register to receive photos or videos posted by the followed user to the first user's camera roll, folder, or screensaver album where it can be viewed on a device such as a television. For example, when Johnny Depp posts an image or video to Twitter or other social media, the image or video, along with metadata including but not limited to any text associated with the post, is automatically downloaded to the specified user folder or camera roll. Additionally, the first user may select a plurality of followed users to create a group of followed users. For example, a user may follow Frank Sinatra, Dean Martin and Sammy Davis, Junior to create a Rat Pack group. Further, if the device's user interface provides a television guide interface, the images or videos may automatically be categorized based on the context, the followed user (such as Johnny Depp), context and followed user, or other criteria and shown on the television (as depicted in block 2245 of FIG. 22, am example of which is depicted at block 2410 in FIG. 24). The thumbnail or box cover for the category may be set as the profile picture of the followed user, a first image of the category, a generic category image or a highly re-shared image.

Figure 23:
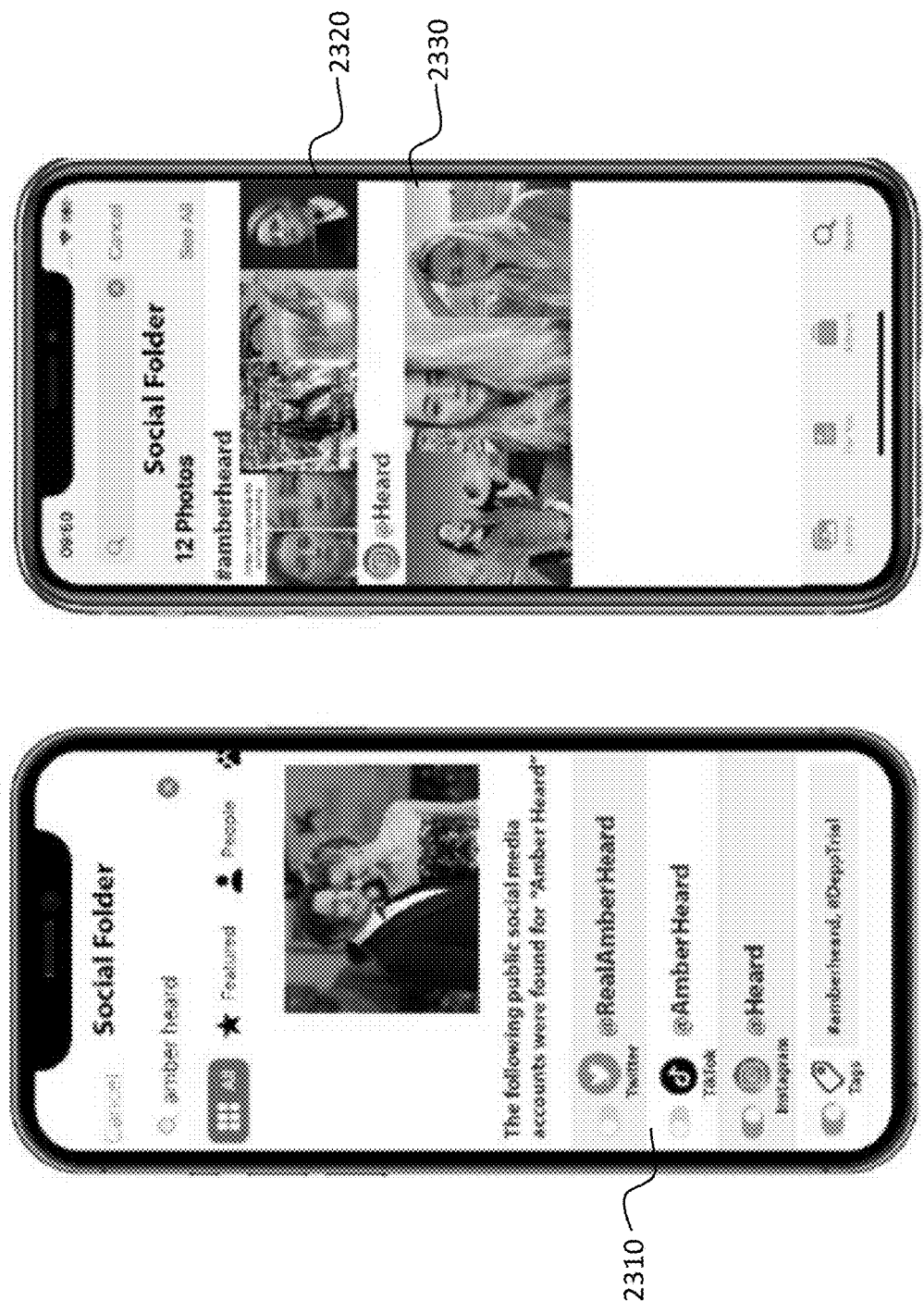
FIG. 23 depicts an example of a user interface for following a social media user and displaying images shared by the social media user on the display of the followers, in accordance with some embodiments of the disclosure.
Figure 24:
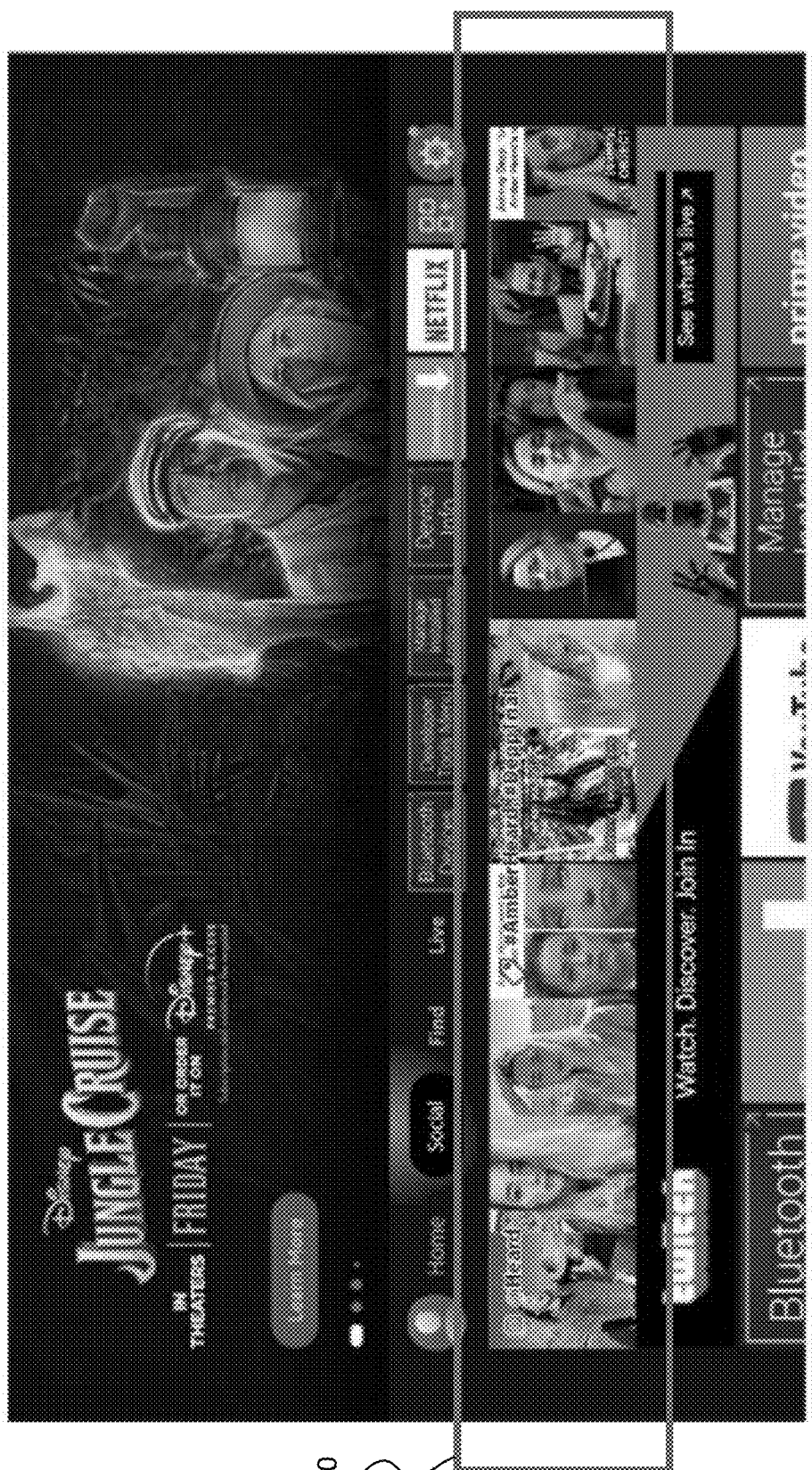
FIG. 24 depicts an example of user a interface related to a television or media device for displaying images or media items shared by a social media user to their followers, in accordance with some embodiments of the disclosure.

One example of user interfaces used in the social media context described herein is depicted in FIG. 23. As depicted at 2310, a user may follow multiple social media accounts of a celebrity, such as Amber Heard. As seen here in this figure, the user is following Amber Heard's Twitter™, TikTok™, Instagram™ accounts and any social media posts with hashtag Amber Heard. In this example, the user has activated Instagram and tags to be able to see all the photos currently posted or shared by Amber Heard. As depicted at 2320 and 2330, pictures that have a hashtag of Amber Heard or are posted on the Instagram are simultaneously and in real time viewable by the user in their social media folder. Likewise, the user may follow multiple celebrities and followers and have their social media posted images appear by category in their social folder. The user may also be given an option to turn any particular social feed on or off such that only images shared on a social media platform that has been turned on in the user interface are shown live to the user and those turned off are not shown.

Although some modes of sharing a media asset have been described. The embodiments re not so limited and other sharing modes may also be used. The control circuitry may allow the user, system, or server to generate and implement various sharing rules and stages. In some embodiments, there may be various stages of sharing media items. For example, if the media item is a photo, there may be two, three or more stages of photo transfer. In the first stage, once a lower quality version of the photo may be sent to all the member in a group shared camera group. Then if a member of the group interacts with a photo, such as clicks on it, gazes at it, or is engaged with it in some other manner, then a better-quality photo, such as a high-resolution photo, may be transferred for download from a storage location that is available. In some embodiments, the high-quality photo may be the original photo by the original author and in another embodiment, it may be a photo from another member of the group that has downloaded the photo in better quality. The quality of the photo may also be determined by the capabilities of the devices, such as the receiving device's resolution or data capabilities (e.g., the user device may receive 5G=high quality in most places, however, since the device is currently in a remote space, like a jungle, then less than 5G may be received, such as 2G, which may result in low quality photo).

It should be noted that the features and limitations described in any one embodiment may be applied to any other embodiment herein. For example, embodiments relating to sharing of a media item may use any of the systems and processes described above.

As described above, a method of sharing a media item includes determining that a first condition is satisfied, where the first condition is proximity of a first electronic device within a predetermined distance of a second electronic device (or within a predetermined distance of a location). The control circuitry then determines that the second electronic device is associated with a contact of the first electronic device. The control circuitry also determines whether a second condition is satisfied. In response to determining that the first and the second conditions are satisfied, the control circuitry automatically selects one or more media items from the first electronic device, and automatically causes the second electronic device to provide an output based on the selected one or more media items from the first electronic device.

In other embodiments, proximity may be from a location. In such embodiments, the method of sharing ay include determining that a first condition is satisfied, where the first condition is proximity of a first electronic device within a predetermined distance of a second electronic device. The system may then determine that the second electronic device is associated with a contact of the first electronic device, such as listed in an address book of the first device, social media contact of a profile associated with the first device etc. The system may determine that a second condition is satisfied. As described above, the second condition may be a date-specific event, a rule, any event, tied to a home automation device, or any other condition either configured by the user of the first electronic device or system configured that is used to as a condition for sharing the media item. The system in response to determining that the first and the second conditions are satisfied, and the second electronic device is associated with the contact of the first electronic device may automatically selecting one or more media items from the first electronic device, and automatically cause the second electronic device to provide an output based on the selected one or more media items from the first electronic device.

In some embodiments, the one or more media items selected are any one or combination of an image, video, audio, or haptic feedback.

In some embodiments, the automatically caused output on the second electronic device includes modifying a wallpaper or lock screen on the second electronic device with the one or more selected media items. For example, an existing wallpaper on the second electronic device is replaced or modified.

In some embodiments, the automatically caused output on the second electronic device includes modifying any one of ringtones, alarms, videos, haptic feedbacks, or images on the second electronic device with the one or more selected media items.

In some embodiments, the process of determining that the first condition is satisfied, i.e. the proximity of the second electronic device to the first electronic device, includes requesting the second electronic device to share its location and in response to the request, receiving a current location of the second electronic device and using the received current location of the second electronic device to determine whether the second electronic device is within the predetermined distance of the first electronic device. As mentioned above, proximity may be determined based on whether a second electronic device is within a predetermined distance from a first electronic device or based on a location, such as Chicago. It may also be based on a predetermined distance between the location and the electronic device. It may also be based on distance from a specific monument, address, or place.

In some embodiments, selecting the one or more media items from the first electronic device includes automatically selecting at least one media item that is related to a user associated with the second electronic device.

In some embodiments, the selected at least one media item is a photograph in which the user associated with the second electronic device is depicted. The process of selecting the photograph further includes obtaining a stored facial profile of the user associated with the second electronic device, comparing the stored facial profile with the photograph to determine whether individual in the photograph is the user associated with the stored facial profile, selecting the photograph in response to determining that the individual in the photograph is the user associated with the stored facial profile.

In some embodiments, the second condition is a date-specific event, such as a birthday or anniversary of a user associated with the second electronic device.

In some embodiments, the control circuitry activates a communication tool when automatically causing the second electronic device to provide an output based on the selected one or more media items from the first electronic device. The communication tool allows the second electronic device to communicate with the first electronic device. In some embodiments, the tool is activated when the user of the second electronic device consumes the shared media item.

In some embodiments, the control circuitry receives a request from a requesting electronic device to subscribe to receiving one or more media assets. The control circuitry also receives a condition for fulfilling the subscription. This condition relates to the requesting electronic device being within a predetermined proximity to a location of an event related to the subscription, such as within a predetermined distance of a game being played at a location, such as the requesting electronic device being within a distance of the Chase Center™ when NBA Warriors™ playing are playing at the Chase center. The control circuitry in response to the condition being satisfied may automatically causes the requesting electronic device to provide an output of the subscribed one or more media assets. This output may be modifying a wallpaper on the requesting electronic device with the one or more media assets.

In some embodiments, the request to subscribe includes subscribing to a plan offered by an entity or service fulfilling the subscription. The plan may include a plurality of subscription tiers where each tier is associated with a different benefit. For example, a higher subscription tier provides media assets at a higher frequency than a lower subscription tier.

In some embodiments, the entity providing the media asset or fulfilling the subscription is a sports team and the output of the subscribed one or more media assets is provided each time there is a score change while the sports team is playing a game.

In some embodiments, the control circuitry receives a notification of a shared content mode activated on a first electronic device. The control circuitry identifies a second electronic device that is within a predetermined location of the first electronic device, and that has activated the shared content mode. The control circuitry automatically generates, based on a selection factor, a shared content group that includes the first and second electronic devices. The control circuitry receives an indication that the first electronic device has shared a media asset with the shared content group, and in response to the indication, provides the second electronic device with access to the media asset.

In some embodiments, the selection factor indicates that a profile associated with the second electronic device is associated with a contact of the first electronic device. In other embodiments, the selection factor indicates that a first social media profile associated with the first electronic device is connected with a second social media profile associated with the second electronic device.

In some embodiments, the selection factor indicates that users associated with the first and second electronic devices share a contextual relationship. The shared contextual relationship, in some embodiments, relates to both users associated with first and second electronic devices participating in a same event, group, or email chain. In some embodiments, the shared contextual relationship relates to both users associated with first and second electronic devices participating in a date-specific event and in response to the determination that a shared relationship exists, the control circuitry causes display of the shared media asset automatically on a display of the second electronic device.

In some embodiments, the control circuitry performs facial recognition to confirm that the user associated with the second electronic device is the same person depicted in the shared media asset. In response to determining that the shared media asset includes the depiction of the user associated with the second electronic device, the control circuitry causes display of the shared media asset automatically on a display of the second electronic device. The performing of the facial recognition of a user associated with the second electronic device includes capturing a profile picture of the user associated with the second electronic device, sending the profile picture to the second electronic device for confirmation, and receiving a confirmation from the second electronic device verifying that the profile picture is associated with the user of the second electronic device.

In some embodiments, the control circuitry performs a voice recognition of a user associated with the second electronic device to confirm they are the user depicted in the shared media asset. The process or performing the voice recognition includes capturing a voice sample of the user associated with the second electronic device, sending the voice sample to the second electronic device for confirmation, and receiving a confirmation from the second electronic device verifying that the voice sample is associated with a voice of the user of the second electronic device.

In some embodiments, the selection factor is location-based context. Using the location-based context as a selection factor includes determining that the users associated with the first and second electronic devices have previously visited a location depicted in the shared media asset, and in response to the determination causing display of the shared media asset automatically on a display of the second electronic device.

In some embodiments, the predetermined location includes a predetermined distance from the predetermined location and in other embodiments, the predetermined location includes a predetermined distance from the first electronic device.

In some embodiments, the control circuitry identifies that the second electronic device is within the predetermined distance from the first electronic device. The identification process includes receiving a current location of the second electronic device, calculating a distance between a current location of the first electronic device and the current location of the second electronic device, and identifying the second electronic device as a device for sharing the shared media asset upon determining that the distance between the current location of the first electronic device and the current location of the second electronic device is within the predetermined distance.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method of sharing a media item comprising:
   determining that a first condition is satisfied, wherein the first condition is proximity of a first electronic device within a predetermined distance of a second electronic device;
   determining that the second electronic device is associated with a contact of the first electronic device;
   determining that a second condition is satisfied, wherein the second condition is associated with a rule or event that relates to a home automation device; and
   in response to determining that the first and the second conditions are satisfied, and the second electronic device is associated with the contact of the first electronic device:
      automatically selecting one or more media items from the first electronic device, wherein the at least one media item is at least one of a photograph, video, or audio associated with a user of the second device and the selection is performed upon verifying that the user's depiction or voice is included in the selected at least one media item; and
      automatically causing the second electronic device to provide an output based on the selected one or more media items from the first electronic device.

2. The method of claim 1, wherein, the one or more media items selected is a haptic feedback.

3. The method of claim 1, wherein automatically causing the second electronic device to provide an output includes modifying a wallpaper, lock screen, ringtone, alarm, video, haptic feedback, or an image on the second electronic device with the one or more selected media items.

4. The method of claim 1, wherein determining that the first condition is satisfied comprises:
    requesting the second electronic device to share its location;
    in response to the request, receiving a current location of the second electronic device; and
    using the received current location of the second electronic device to determine whether the second electronic device is within the predetermined distance of the first electronic device.

5. The method of claim 1, wherein selecting the one or more media items from the first electronic device comprises automatically selecting at an audio file that includes the voice of the user of the second electronic device.

6. The method of claim 1, wherein the selected at least one media item is the photograph in which the user associated with the second electronic device is depicted.

7. The method of claim 6, wherein, selecting the photograph further comprises:
    obtaining a stored facial profile of the user associated with the second electronic device;
    comparing the stored facial profile with the photograph to determine whether individual in the photograph is the user associated with the stored facial profile; and
    selecting the photograph in response to determining that the individual in the photograph is the user associated with the stored facial profile.

8. The method of claim 1, wherein the second condition is a date-specific event, wherein the date-specific event is a birthday or anniversary of the user associated with the second electronic device.

9. The method of claim 1, further comprising:
    detecting the home automation device;
    determining the second condition is associated with the home automation device; and
    in response to the home automation device reaching the second condition:
    automatically causing the second electronic device to provide an output based on the selected one or more media items from the first electronic device.

10. The method of claim 1, further comprising: activating a communication tool when automatically causing the second electronic device to provide an output based on the selected one or more media items from the first electronic device, wherein the communication tool allows the second electronic device to communicate with the first electronic device.

11. A system for sharing a media item comprising:
    communications circuitry configured to communicate with a first electronic device and a second electronic device; and
    control circuitry configured to:
    determine that a first condition is satisfied, wherein the first condition is proximity of the first electronic device within a predetermined distance of the second electronic device;
    determine that the second electronic device is associated with a contact of the first electronic device;
    determine that whether a second condition is satisfied, wherein the second condition is associated with a rule or event that relates to a home automation device; and
    in response to determining that the first and the second conditions are satisfied:
    automatically select one or more media items from the first electronic device, wherein the at least one media item is at least any one of a photograph, video, or audio associated with a user of the second device and the selection is performed upon verifying that the user's depiction or voice is included in the selected at least one media item; and
    automatically cause the second electronic device to provide an output based on the selected one or more media items from the first electronic device.

12. The system of claim 11, wherein, the one or more media items selected is a haptic feedback.

13. The system of claim 11, wherein the automatically caused output on the second electronic device includes the control circuitry configured to modify a wallpaper, lock screen, ringtone, alarm, video, haptic feedback, or an image on the second electronic device with the one or more selected media items.

14. The system of claim 11, wherein determining that the first condition is satisfied comprises, the control circuitry configured to:
    request the second electronic device to share its location;
    in response to the request, receive a current location of the second electronic device; and
    use the received current location of the second electronic device to determine whether the second electronic device is within the predetermined distance of the first electronic device.

15. The system of claim 11, wherein selecting the one or more media items from the first electronic device comprises the control circuitry configured to automatically select an audio file that includes the voice of the user of the second electronic device.

16. The system of claim 11, wherein the selected at least one media item is the photograph in which the user associated with the second electronic device is depicted.

17. The system of claim 16, wherein, selecting the photograph further comprises, the control circuitry configured to:
    obtain a stored facial profile of the user associated with the second electronic device;
    compare the stored facial profile with the photograph to determine whether individual in the photograph is the user associated with the stored facial profile; and
    select the photograph in response to determining that the individual in the photograph is the user associated with the stored facial profile.

18. The system of claim 11, wherein the second condition is a date-specific event.

19. The system of claim 11, further comprising, the control circuitry configured to:
    detect the home automation device;
    determine the second condition is associated with the home automation device; and
    in response to the home automation device reaching the second condition: automatically cause the second electronic device to provide an output based on the selected one or more media items from the first electronic device.

20. The system of claim 11, further comprising, the control circuitry configured to: activate a communication tool when automatically causing the second electronic device to provide an output based on the selected one or more media items from the first electronic device, wherein the communication tool allows the second electronic device to communicate with the first electronic device.

* * * * *